(12) United States Patent
Tsai et al.

(10) Patent No.: US 8,743,478 B2
(45) Date of Patent: Jun. 3, 2014

(54) OPTICAL LENS FOR IMAGE PICKUP

(75) Inventors: Tsung-Han Tsai, Taichung (TW); Ming-Ta Chou, Taichung (TW)

(73) Assignee: Largan Precision Co., Taichung (TW)

( * ) Notice: Subject to any disclaimer, the term of this patent is extended or adjusted under 35 U.S.C. 154(b) by 198 days.

(21) Appl. No.: 13/399,426

(22) Filed: Feb. 17, 2012

(65) Prior Publication Data

US 2013/0016435 A1    Jan. 17, 2013

(30) Foreign Application Priority Data

Jul. 11, 2011   (TW) .............................. 100124481 A

(51) Int. Cl.
*G02B 13/18* (2006.01)
*G02B 9/60* (2006.01)

(52) U.S. Cl.
USPC ......................................... 359/714; 359/764

(58) Field of Classification Search
USPC .................................. 359/713–714, 763–764
See application file for complete search history.

(56) References Cited

U.S. PATENT DOCUMENTS

| | | | |
|---|---|---|---|
| 7,480,105 B2 | 1/2009 | Mori | |
| 7,663,813 B2 | 2/2010 | Lai | |
| 2010/0134904 A1* | 6/2010 | Tsai | 359/764 |
| 2010/0220229 A1* | 9/2010 | Sano | 348/340 |
| 2011/0134305 A1* | 6/2011 | Sano et al. | 348/340 |
| 2011/0188131 A1* | 8/2011 | Sano | 359/714 |

* cited by examiner

*Primary Examiner* — Jordan Schwartz
(74) *Attorney, Agent, or Firm* — Wang Law Firm, Inc.; Li K. Wang; Stephen Hsu

(57) ABSTRACT

An optical lens for image pickup, sequentially arranged from an object side to an image side along the optical axis comprising: a first lens element with positive refractive power having a convex object-side surface; a second lens element with negative refractive power; a third lens element with refractive power; a plastic fourth lens element with positive refractive power having biconvex surfaces with at least one aspheric surface; and a plastic fifth lens element with negative refractive power having a concave image-side surface, with at least one aspheric surface and at least one inflection point. By such arrangements, the optical lens for image pickup satisfies conditions related to shorten the total length and to reduce the sensitivity for use in compact cameras and mobile phones with camera functionalities.

22 Claims, 12 Drawing Sheets

OPTICAL LENS FOR IMAGE PICKUP

CROSS-REFERENCE TO RELATED APPLICATION

This application claims the benefit of priority to Taiwan Patent Application No. 100124481, filed on Jul. 11, 2011, in the Taiwan Intellectual Property Office, the disclosure of which is incorporated herein in its entirety by reference.

BACKGROUND OF THE INVENTION

1. Field of the Invention

The present invention relates to an optical lens for image pickup, and more particularly to the optical lens for image pickup comprised of five lens elements with great image quality for applying to electronic products.

2. Description of the Related Art

In compact electronic products such as digital still cameras or mobile phone cameras, an optical lens for image pickup is generally installed for capturing images of an object, and the optical lens for image pickup tends to be developed with a compact design and a low cost, while meeting the user requirements for good aberration correction ability, high resolution, and high image quality.

In general, a conventional optical lens for image pickup of a compact electronic product comes with different designs, including the two-lens, three-lens, four-lens, and five-or-more lens designs. However, if the imaging quality is taken into consideration, the optical lens for image pickup with the four-lens or five-lens designs has advantages on image aberration and modulation transfer function (MTF) performance.

In various compact designs of the five-lens optical lens for image pickup having a fixed focal length, the prior arts adopt different combinations of positive and negative refractive powers. As disclosed in U.S. Pat. No. 7,663,813 which adopts a group of stacked lens elements, in which the two cemented glass lenses incur a higher manufacturing cost, and such conventional optical lens for image pickup is unfavorable for the cost control of mass production. Another conventional technique is the combination of a first lens element with negative refractive power and a second lens element with positive refractive power as disclosed in U.S. Pat. No. 7,480,105, but such conventional optical lens for image pickup cannot reduce the total length of the optical system easily to meet the requirement of the compact design.

Therefore, the present invention provides a more practical design to shorten the optical lens for image pickup, while using a combination of refractive powers and a combination of convex and concave surfaces of five lens elements to lower the cost for mass production easily and apply the optical lens for image pickup to compact electronic products.

SUMMARY OF THE INVENTION

Therefore, it is a primary objective of the present invention to provide an optical lens for image pickup, sequentially arranged from an object side to an image side along an optical axis, comprising: a first lens element, a second lens element, a third lens element, a fourth lens element and a fifth lens element. Wherein the first lens element with positive refractive power has a convex object-side surface; the second lens element has negative refractive power; the third lens element has refractive power; the fourth lens element with positive refractive power is made of plastic, and has a convex object-side surface and a convex image-side surface, and at least one of the object-side surface and the image-side surface is aspheric; the fifth lens element with negative refractive power is made of plastic and has a concave image-side surface and at least one of the object-side surface and the image-side surface is aspheric, and at least one of the object-side surface and the image-side surface has at least one inflection point, and the following relation is satisfied:

$$-1.0 < R_7/R_8 < 0; \quad (1)$$

wherein, $R_7$ is the curvature radius of the object-side surface of the fourth lens element, and $R_8$ is the curvature radius of the image-side surface of the fourth lens element.

On the other hand, the present invention provides an optical lens for image pickup, as described above, wherein the second lens element has a concave image-side surface; and the optical lens for image pickup satisfies one or more of the following relations in addition to the relation (1):

$$0 < f/f_4 < 1.0; \quad (2)$$

$$0 < (R_3+R_4)/(R_3-R_4) < 1.8; \quad (3)$$

$$1.2 < f/f_1 < 1.8; \quad (4)$$

$$0.2 < CT_4/CT_5 < 1.4; \quad (5)$$

wherein, f is the focal length of the optical lens for image pickup, $f_1$ is the focal length of the first lens element, $f_4$ is the focal length of the fourth lens element, $R_3$ is the curvature radius of the object-side surface of the second lens element, $R_4$ is the curvature radius of the image-side surface of the second lens element, $CT_4$ is the central thickness of the fourth lens element on the optical axis, and $CT_5$ is the central thickness of the fifth lens element on the optical axis.

On the other hand, the present invention provides an optical lens for image pickup, as described above, wherein the second lens element has a concave image-side surface, and the optical lens for image pickup satisfies one or more of the following relations in addition to the relation (1):

$$1.7 < v_1/v_2 < 3.0; \quad (6)$$

$$0 < R_4/f < 1.5; \quad (7)$$

$$0.2 < CT_2/CT_3 < 0.8; \quad (8)$$

wherein, $v_1$ is the Abbe number of the first lens element, $v_2$ is the Abbe number of the second lens element, $R_4$ is the curvature radius of the image-side surface of the second lens element, f is the focal length of the optical lens for image pickup, $CT_2$ is the central thickness of the second lens element on the optical axis, and $CT_3$ is the central thickness of the third lens element on the optical axis.

On the other hand, the present invention provides an optical lens for image pickup, as described above, wherein at least one of the object-side surface and the image-side surface of the fourth lens element has at least one inflection point, and the optical lens for image pickup satisfies the following relation in addition to the relation (1):

$$-1.0 < R_7/R_8 < 0; \quad (9)$$

wherein, $R_7$ is the curvature radius of the object-side surface of the fourth lens element, and $R_8$ is the curvature radius of the image-side surface of the fourth lens element.

Another objective of the present invention is to provide an optical lens for image pickup, sequentially arranged from an object side to an image side along an optical axis, comprising: a first lens element, a second lens element, a third lens element, a fourth lens element and a fifth lens element, wherein the first lens element with positive refractive power has a convex object-side surface; the second lens element with negative refractive power has a concave image-side surface; the third lens element with refractive power has a concave object-side surface; the fourth lens element with positive refractive power is made of plastic and has a convex object-side surface and a convex image-side surface, and at least one of the object-side surface and the image-side surface is aspheric; the fifth lens element with negative refractive power is made of plastic and has a concave image-side surface, and at least one of the object-side surface and the image-side surface is aspheric, and at least one of the object-side surface and the image-side surface has at least one inflection point, and the following relations are satisfied:

$0 < f/f_4 < 1.0;$ (2)

$0.2 < CT_4/CT_5 < 1.4;$ (5)

wherein, f is the focal length of the optical lens for image pickup, $f_4$ is the focal length of the fourth lens element, $CT_4$ is the central thickness of the fourth lens element on the optical axis, and $CT_5$ is the central thickness of the fifth lens element on the optical axis.

On the other hand, the present invention provides an optical lens for image pickup, as described above, wherein, the third lens element has a convex image-side surface, and the optical lens for image pickup satisfies one or more of the following relations in addition to the relations (2) and (5):

$1.2 < f/f_1 < 1.8;$ (4)

$1.7 < v_1/v_2 < 3.0;$ (6)

$-0.7 < f/R_8 < 0;$ (10)

$-0.5 < R_7/R_8 < 0;$ (9)

$0 < (R_3+R_4)/(R_3-R_4) < 1.8;$ (3)

wherein, f is the focal length of the optical lens for image pickup, $f_1$ is the focal length of the first lens element, $v_1$ is the Abbe number of the first lens element, $v_2$ is the Abbe number of the second lens element, $R_3$ is the curvature radius of the object-side surface of the second lens element, $R_4$ is the curvature radius of the image-side surface of the second lens element, $R_7$ is the curvature radius of the object-side surface of the fourth lens element, and $R_8$ is the curvature radius of the image-side surface of the fourth lens element.

Another objective of the present invention is to provide an optical lens for image pickup, sequentially arranged from an object side to an image side along an optical axis, comprising: a first lens element, a second lens element, a third lens element, a fourth lens element and a fifth lens element; wherein the first lens element with positive refractive power has a convex object-side surface; the second lens element with negative refractive power has a concave image-side surface; the third lens element with refractive power has a concave object-side surface and a convex image-side surface; the fourth lens element with positive refractive power is made of plastic and has a convex object-side surface and a convex image-side surface, and at least one of the object-side surface and the image-side surface is aspheric; the fifth lens element with negative refractive power is made of plastic and at least one of the object-side surface and the image-side surface is aspheric, and at least one of the object-side surface and the image-side surface has at least one inflection point, and the following relations are satisfied:

$0 < f/f_4 < 1.0;$ (2)

$0 < R_4/f < 1.5;$ (7)

$-0.7 < f/R_8 < 0;$ (10)

wherein, f is the focal length of the optical lens for image pickup, $f_4$ is the focal length of the fourth lens element, $R_4$ is the curvature radius of the image-side surface of the second lens element, and $R_8$ is the curvature radius of the image-side surface of the fourth lens element.

On the other hand, the present invention provides an optical lens for image pickup, as described above, wherein the optical lens for image pickup satisfies one or more of the following relations in addition to the relations (2), (7) and (10):

$1.7 < v_1/v_2 < 3.0;$ (6)

$0.2 < CT_4/CT_5 < 1.4;$ (5)

$1.2 < f/f_1 < 1.8;$ (4)

$0.2 < CT_2/CT_3 < 0.8;$ (8)

wherein, $v_1$ is the Abbe number of the first lens element, $v_2$ is the Abbe number of the second lens element, f is the focal length of the optical lens for image pickup, $f_1$ is the focal length of the first lens element, $CT_2$ is the central thickness of the second lens element on the optical axis, $CT_3$ is the central thickness of the third lens element on the optical axis, $CT_4$ is the central thickness of the fourth lens element on the optical axis, and $CT_5$ is the central thickness of the fifth lens element on the optical axis.

In the optical lens for image pickup of the present invention, the optical lens for image pickup comprises a first lens element, a second lens element, a third lens element, a fourth lens element and a fifth lens element. Wherein the first lens element provides most of the refractive power required by the system, and the second lens element with negative refractive power can correct aberrations produced by the lens element with positive refractive power effectively and correct the Petzval sum of the system to make the image surface on the edge flatter. If the second lens element has a concave image-side surface, the intensity of the negative refractive power of the second lens element can be adjusted appropriately according to the surface shape to provide a good aberration correction effect for the system. If the third lens element is a meniscus lens element having a concave object-side surface and a convex image-side surface, the effect of correcting astigmatism can be improved. If the curvature at the position of the periphery is greater than the curvature at the center of the image-side surface, the angle of the incident light from the periphery of the system can be suppressed within a range of projecting onto the sensor to improve the light sensitivity of the image sensor. In addition, the supplementary installation of the fourth lens element with positive refractive power and the fifth lens element with negative refractive power can produce a telecentric effect to facilitate reducing the focal length and the total length of the optical system. If the fourth lens element has a convex image-side surface, the correction of the astigmatism and the high-order aberration of the optical lens for image pickup can be improved. If the fifth lens element has a concave image-side surface, the principal point of the optical system can be maintained at a position far from the image plane to facilitate reducing the total length of optical imaging lens assembly and miniaturizing the size of the optical system. With such configuration of the optical lens for image pickup, the image sensor can achieve a greater effective pixel range with the same total length.

If the fifth lens element has an inflection point, the inflection point can be used for guiding the image light projecting out the edge of the fifth lens element at an angle, such that the image light is guided to the image sensor at the off-axis view angle and received by the image sensor. In addition, the fourth lens element and the fifth lens element are made of plastic to facilitate the manufacture and lower the cost.

DETAILED DESCRIPTION OF THE PREFERRED EMBODIMENTS

Figure 1A:
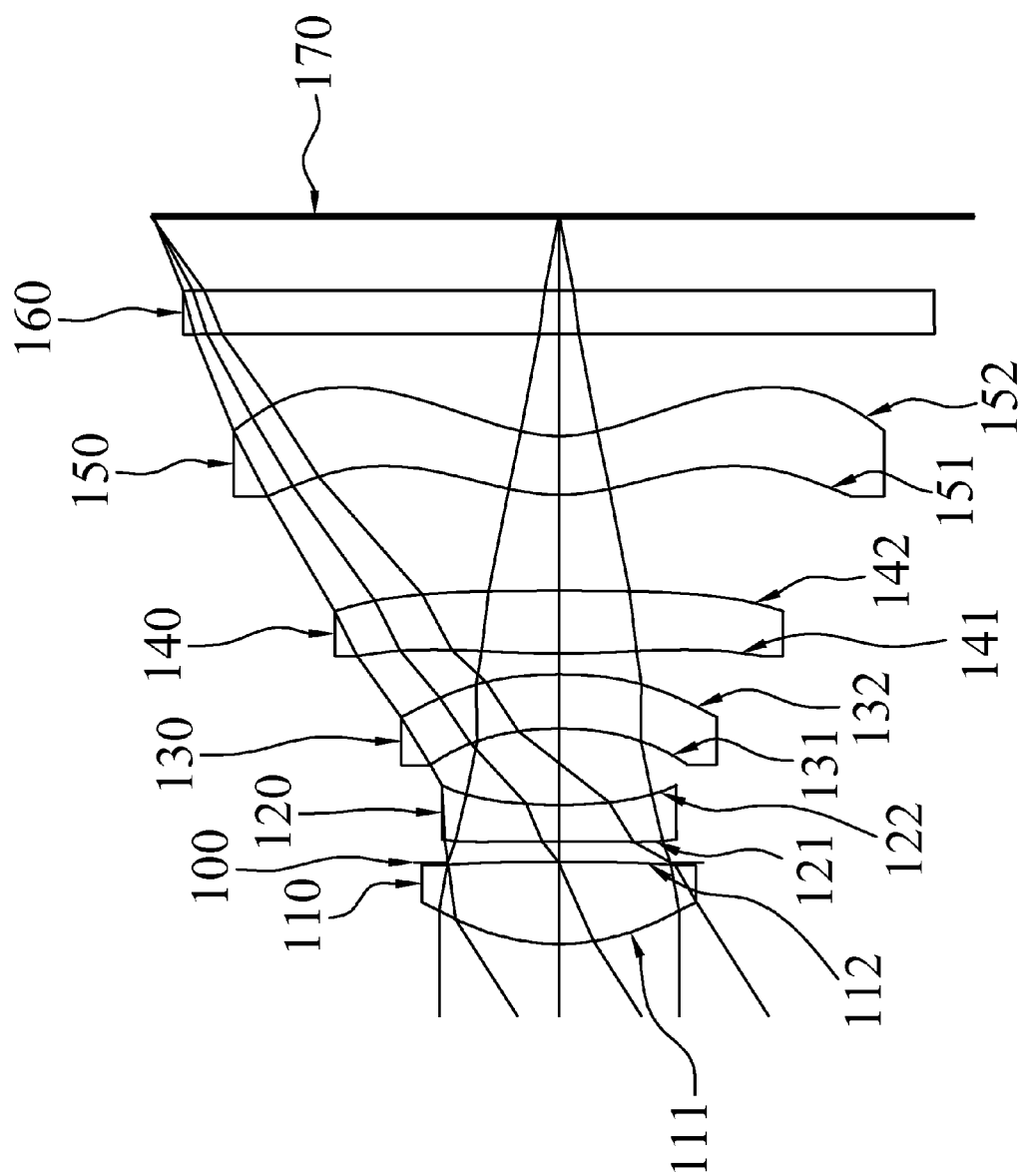
FIG. 1A is a schematic view of an optical lens for image pickup in accordance with the first preferred embodiment of the present invention.

With reference to FIG. 1A, the present invention provides an optical lens for image pickup, sequentially arranged from an object side to an image side along an optical axis, comprising: a first lens element 110, a second lens element 120, a third lens element 130, a fourth lens element 140 and a fifth lens element 150; wherein the first lens element 110 with positive refractive power has a convex object-side surface 111; the second lens element 120 has negative refractive power; the third lens element 130 has refractive power; the fourth lens element 140 with positive refractive power is made of plastic and has a convex object-side surface 141 and a convex image-side surface 142, and at least one of the object-side surface 141 and the image-side surface 142 is aspheric; the fifth lens element 150 with negative refractive power is made of plastic, and has a concave image-side surface 152, and at least one of the object-side surface 151 and the image-side surface 152 is aspheric, and at least one of the object-side surface 151 and the image-side surface 152 has at least one inflection point. The optical lens for image pickup further comprises a stop and an IR-filter 160, and the stop can be an aperture stop 100, which is a front aperture stop installed between a photographed object and the first lens element 110. The IR-filter 160 is installed between the fifth lens element 150 and the image plane 170 generally made of a panel optical material without affecting the focal length of the optical lens for image pickup of the present invention. The aspheric surfaces of the first lens element 110, the second lens element 120, the third lens element 130, the fourth lens element 140 and the fifth lens element 150 comply with the aspherical surface formula as given in Equation (11).

$$X(Y) = \frac{(Y^2/R)}{1 + \sqrt{(1-(1+K)(Y/R)^2)}} + \sum_i (A_i) \cdot (Y^i) \quad (11)$$

Wherein,

X is the relative height from a point on the aspherical surface with a distance Y between the optical axis and a tangent plane at the tip of the optical axis of the aspherical surface;

Y is the distance between a point on the curve of the aspherical surface and the optical axis;

R is the curvature radius;

K is the conic coefficient; and $A_i$ is the $i^{th}$ level aspherical surface coefficient.

In the optical lens for image pickup of the present invention, the first lens element 110, second lens element 120, and third lens element 130 have aspheric surfaces, the curvature radius of the optical surface can be used for changing the refractive power to reduce or eliminate aberrations, so as to reduce the number of lenses used in the optical lens for image pickup and reduce the total length of the optical lens for image pickup effectively. With the installation of the first lens element 110, second lens element 120, third lens element 130, fourth lens element 140, and fifth lens element 150, the optical lens for image pickup satisfies the relation (1).

In the optical lens for image pickup of the present invention, the major positive refractive power is provided by the first lens element 110 and the fourth lens element 140. If the ratio of the curvature radius $R_7$ of the object-side surface 141 of the fourth lens element 140 to the curvature radius $R_8$ of the image-side surface 142 is limited according to the relation (1), the variation of surface shape of the object-side surface 141 and the image-side surface 142 of the fourth lens element 140 can be limited, not only facilitating the correction of the spherical aberration of the fourth lens element 140, but also appropriately adjusting the complementary correction of the refractive power of the fourth lens element 140 and the refractive power of the fifth lens element 150 if the relation (2) is satisfied, such that the telecentric effect is produced to facilitate reduction of the focal length and the total length, thereby achieving the effect of miniaturizing the lens.

If the relation (10) is satisfied, the curvature radius $R_8$ of the image-side surface 142 of the fourth lens element 140 is greater than the focal length f of the optical lens for image pickup to facilitate limiting the positive refractive power of the fourth lens element 140 in order to compensate the near-axis aberration more easily. If the ratio of the focal length $f_1$ of the first lens element 110 to the focal length f of the optical lens for image pickup is limited according to the relation (4), the positive refractive power of the first lens element 110 can be allocated appropriately to adjust the focal length of the optical system and reduce the total length appropriately. If the relation (7) is satisfied, and the second lens element 120 has a concave image-side surface 122, the curvature radius $R_4$ of the image-side surface 122 of the second lens element 120 is smaller than the focal length f of the optical lens for image pickup, which facilitates increasing the refractive power of the second lens element 120 and compensating the near-axis aberration more easily. If the ratio in the relation is too large, then the negative refractive power is relatively weaker, and the chromatic aberration correction ability becomes weaker. If the ratio in the relation is too small, then the negative refractive power is relatively stronger, so that the total length cannot be reduced effectively, so that if this relation is limited within an appropriate range, the effects of correcting the aberration and reducing the total length can be achieved to facilitate the allocation of the refractive power of the first lens element 110 and the second lens element 120.

If the ratio of the curvature radius $R_3$ of the object-side surface 121 of the second lens element 120 to the curvature radius $R_4$ of the image-side surface 122 is limited according to the relations (3), the change of the surface shape of the second lens element 120 can be limited to facilitate the aberration correction function of the second lens element 120 with negative refractive power. In addition, the fourth lens element 140 has a convex image-side surface 142. If the ratio of the curvature radius of the object-side surface 141 to the curvature radius of the image-side surface 142 is limited according to the relation (9), the refractive power of the fourth lens element 140 can be allocated appropriately to achieve the effects of reducing the sensitivity of the manufacture, improving the yield rate, and saving the production cost.

If the relation (6) is satisfied, the difference between the Abbe number $v_1$ of the first lens element 110 and the Abbe number $v_2$ of the second lens element 120 falls within an appropriate range, and the chromatic aberration produced by the first lens element 110 and the second lens element 120 can be corrected effectively. If the relation (5) or (8) is satisfied, the thickness of the second lens element 120, third lens element 130, fourth lens element 140 and fifth lens element 150 can be adjusted to facilitate reduction of the total length of the optical lens for image pickup, and the optical lens for image pickup thick enough to maintain the yield rate of the manufacturing process.

The optical lens for image pickup of the present invention is described by means of preferred embodiments with relevant drawings as follows.

First Preferred Embodiment

Figure 1B:
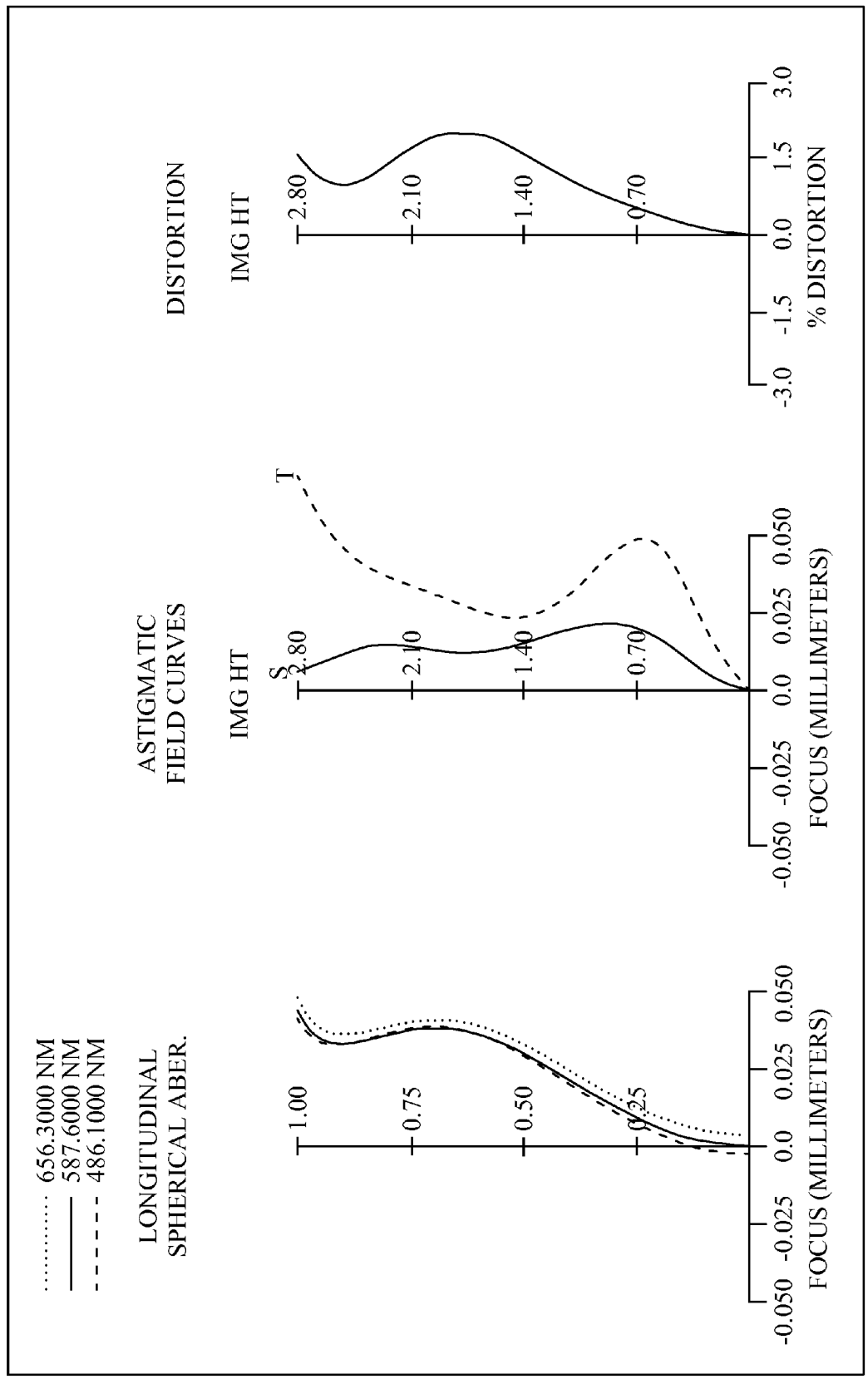
FIG. 1B is a schematic view of a series of aberration curves of the first preferred embodiment of the present invention.

With reference to FIGS. 1A and 1B for a schematic view and a series of aberration curves of an optical lens for image pickup in accordance with the first preferred embodiment of the present invention respectively, the optical lens for image pickup comprises five lens elements, an aperture stop 100 and an IR-filter 160. More specifically, the optical lens for image pickup of the present invention, sequentially arranged from an object side to an image side along an optical axis, comprises: a plastic first lens element 110 with positive refractive power, having a convex object-side surface 111 and a convex image-side surface 112, and both object-side surface 111 and image-side surface 112 being aspheric; an aperture stop 100; a plastic second lens element 120 with negative refractive power, having a concave object-side surface 121 and a concave image-side surface 122, and both object-side surface 121 and image-side surface 122 being aspheric; a plastic third lens element 130 with negative refractive power, having a concave object-side surface 131 and a convex image-side surface 132, and both object-side surface 131 and image-side surface 132 being aspheric; a plastic fourth lens element 140 with positive refractive power, having a convex object-side surface 141 and a convex image-side surface 142, and both object-side surface 141 and image-side surface 142 being aspheric; a plastic fifth lens element 150 with negative refractive power, having a convex object-side surface 151 and a concave image-side surface 152, both object-side surface 151 and image-side surface 152 being aspheric, and at least one of the object-side surface 151 and the image-side surface 152 having at least one inflection point; and an IR-filter 160 made of panel glass for adjusting a wavelength section of the light of an image. With the combination of the five lens elements, the aperture stop 100 and the IR-filter 160, an image of the photographed object can be formed at the image plane 170.

TABLE 1

Optical data of this preferred embodiment
f = 4.30 mm, Fno = 2.60, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | | 1.543340 (ASP) | 0.565 | | | | |
| | Lens 1 | | | Plastic | 1.544 | 55.9 | 2.76 |
| 2 | | −50.020500 (ASP) | −0.006 | | | | |
| 3 | Ape. Stop | Plano | 0.149 | | | | |
| 4 | | −28.968700 (ASP) | 0.250 | | | | |
| | Lens 2 | | | Plastic | 1.634 | 23.8 | −5.16 |
| 5 | | 3.696800 (ASP) | 0.526 | | | | |
| 6 | | −1.997210 (ASP) | 0.374 | | | | |
| | Lens 3 | | | Plastic | 1.634 | 23.8 | −17.54 |
| 7 | | −2.611270 (ASP) | 0.144 | | | | |
| 8 | | 7.082200 (ASP) | 0.433 | | | | |
| | Lens 4 | | | Plastic | 1.544 | 55.9 | 10.50 |
| 9 | | −28.985500 (ASP) | 0.659 | | | | |
| 10 | | 1.318510 (ASP) | 0.406 | | | | |
| | Lens 5 | | | Plastic | 1.544 | 55.9 | −20.77 |
| 11 | | 1.052660 (ASP) | 0.700 | | | | |
| 12 | | Plano | 0.300 | | | | |
| | IR-filter | | | Glass | 1.517 | 64.2 | — |
| 13 | | Plano | 0.512 | | | | |
| 14 | Image | Plano | — | | | | |

Note:
Reference wavelength is 587.6 nm. ASP stands for aspherical surfaces.

The optical data of this preferred embodiment are listed in Table 1, wherein the object-side surfaces and the image-side surfaces of the first lens element 110 to the fifth lens element 150 comply with the aspheric surface formula as given in Equation (11), and their aspheric coefficients are listed in Table 2 as follows:

TABLE 2

Aspheric coefficients of this preferred embodiment

| | Surface # | | | | |
|---|---|---|---|---|---|
| | 1 | 2 | 4 | 5 | 6 |
| k = | −3.06355E−01 | −3.00000E+01 | −2.00000E+01 | 2.88304E+00 | 4.27633E−02 |
| A4 = | 2.50446E−03 | −4.94200E−02 | −6.14490E−03 | 4.99730E−02 | −7.67470E−02 |
| A6 = | −1.55993E−02 | 2.47780E−02 | 9.23046E−02 | 4.34781E−02 | 2.50419E−02 |
| A8 = | 1.52702E−02 | −2.25423E−02 | −1.89711E−02 | 9.45095E−02 | −3.96334E−02 |
| A10 = | −4.34215E−02 | −2.73589E−02 | −6.14602E−03 | −1.62870E−01 | 3.46322E−02 |
| A12 = | | 2.53422E−02 | 3.76475E−02 | 1.56936E−01 | −2.39569E−02 |

| | Surface # | | | | |
|---|---|---|---|---|---|
| | 7 | 8 | 9 | 10 | 11 |
| k = | 2.87761E+00 | −2.00000E+01 | −2.00000E+01 | −6.29779E+00 | −4.56785E+00 |
| A4 = | −8.66151E−02 | −5.08900E−02 | −1.28834E−02 | −7.52268E−02 | −5.78631E−02 |
| A6 = | 6.72960E−02 | 8.88439E−03 | −3.94794E−03 | 8.16349E−03 | 1.00587E−02 |
| A8 = | −1.73962E−02 | −4.10142E−04 | 8.50755E−04 | 3.31543E−04 | −1.68186E−03 |
| A10 = | 1.33287E−02 | −6.15772E−04 | 8.77634E−05 | −6.50499E−05 | 3.97827E−05 |
| A12 = | 1.68817E−03 | 2.04068E−04 | −6.24845E−05 | | 2.08062E−05 |
| A14 = | | | | | −1.24326E−06 |

With reference to Table 1 and FIG. 1B for an optical lens for image pickup of this preferred embodiment, the optical lens for image pickup has a focal length f=4.30 (mm), an overall aperture stop value (f-number) Fno=2.60, and a half of the maximum view angle HFOV=32.5°. After the optical data of this preferred embodiment are calculated and derived, the optical imaging system for pickup satisfies related conditions as shown in Table 3 below, and the related symbols have been described above and thus will not be described again.

TABLE 3

Data of related relations of this preferred embodiment

| Relation | Data | Relation | Data |
|---|---|---|---|
| $v_1/v_2$ | 2.35 | $R_7/R_8$ | −0.24 |
| $CT_2/CT_3$ | 0.67 | $(R_3 + R_4)/(R_3 − R_4)$ | 0.77 |
| $CT_4/CT_5$ | 1.07 | $f/f_1$ | 1.56 |
| $R_4/f$ | 0.86 | $f/f_4$ | 0.41 |
| $f/R_8$ | −0.15 | | |

According to the optical data as shown in Table 1 and the series of aberration curves as shown in FIG. 1B, the optical lens for image pickup in accordance with this preferred embodiment of the present invention provides good correction results in aspects of the longitudinal spherical aberration, astigmatic field curving, and distortion.

Second Preferred Embodiment

Figure 2A:
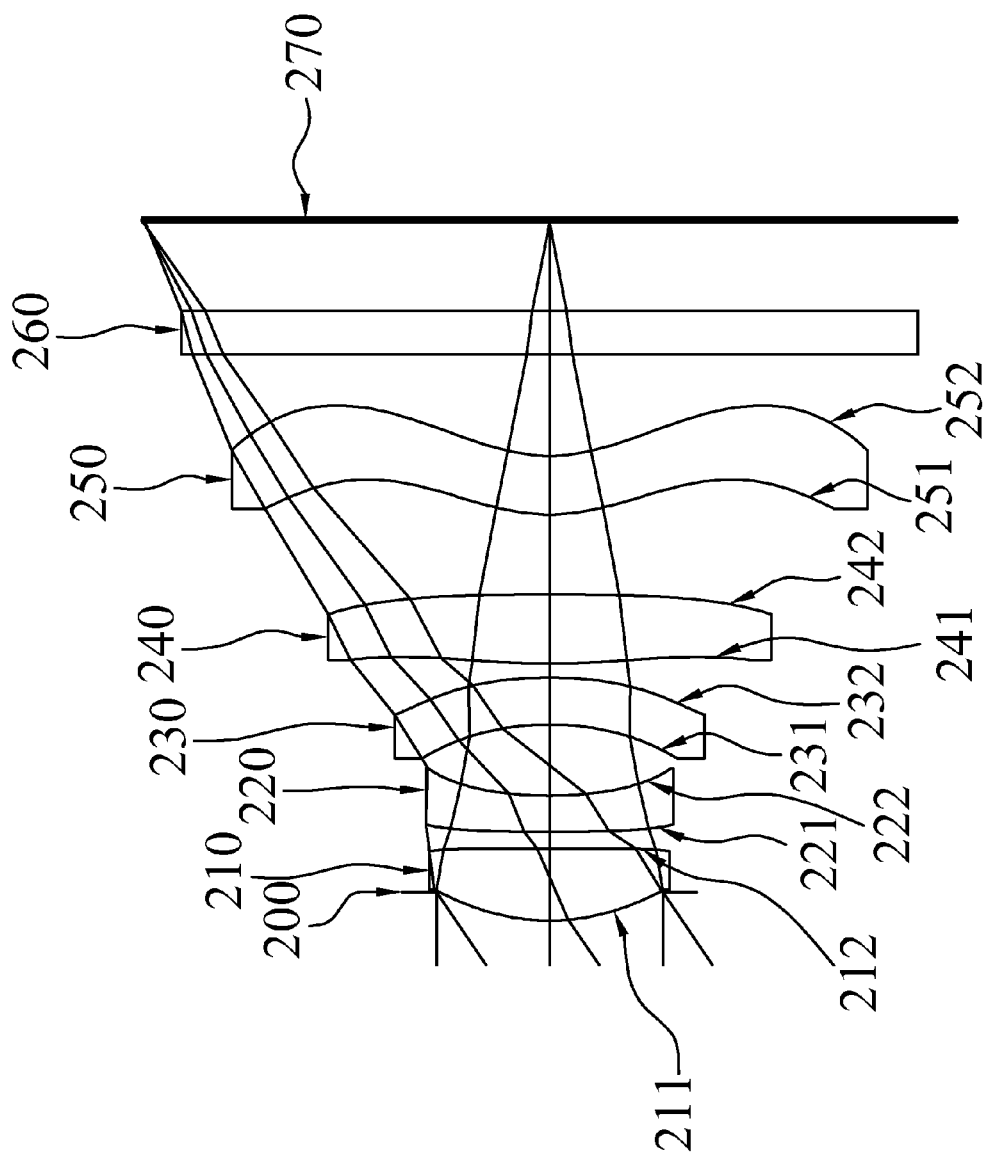
FIG. 2A is a schematic view of an optical lens for image pickup in accordance with the second preferred embodiment of the present invention.
Figure 2B:
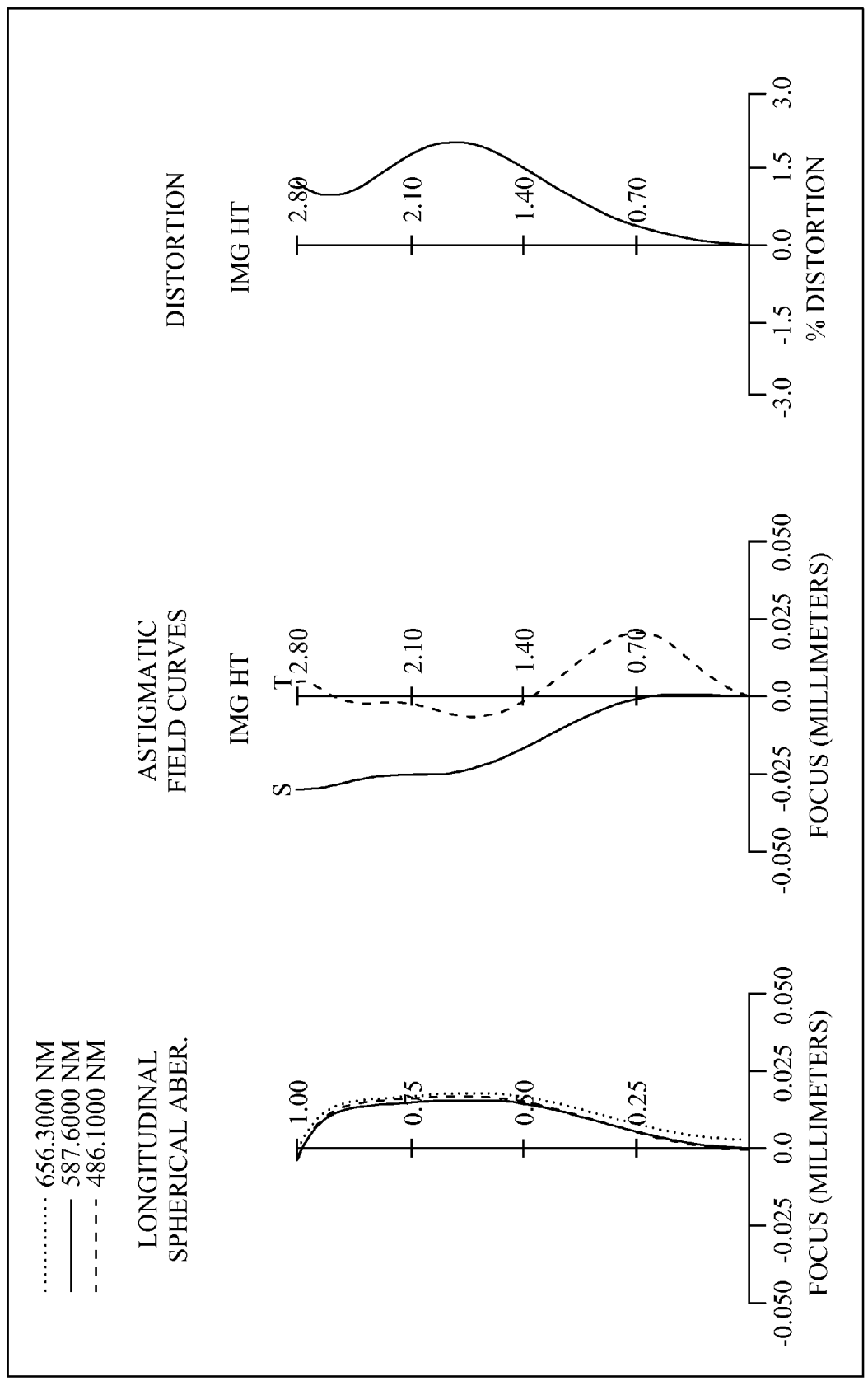
FIG. 2B is a schematic view of a series of aberration curves of the second preferred embodiment of the present invention.

With reference to FIGS. 2A and 2B for a schematic view and a series of aberration curves of an optical lens for image pickup in accordance with the second preferred embodiment of the present invention respectively, the optical lens for image pickup comprises five lens elements, an aperture stop 200 and an IR-filter 260. More specifically, the optical lens for image pickup of the present invention, sequentially arranged from an object side to an image side along an optical axis, comprises: an aperture stop 200; a plastic first lens element 210 with positive refractive power, having a convex object-side surface 211 and a concave image-side surface 212, and both object-side surface 211 and image-side surface 212 being aspheric; a plastic second lens element 220 with negative refractive power, having a convex object-side surface 221 and a concave image-side surface 222, and both object-side surface 221 and image-side surface 222 being aspheric; a plastic third lens element 230 with negative refractive power, having a concave object-side surface 231 and a convex image-side surface 232, and both object-side surface 231 and image-side surface 232 being aspheric; a plastic fourth lens element 240 with positive refractive power, having a convex object-side surface 241 and a convex image-side surface 242, and both object-side surface 241 and image-side surface 242 being aspheric; a plastic fifth lens element 250 with negative refractive power, having a convex object-side surface 251 and a concave image-side surface 252, and both object-side surface 251 and image-side surface 252 being aspheric, and at least one of the object-side surface 251 and the image-side surface 252 having at least one inflection point; and an IR-filter 260 made of panel glass for adjusting a wavelength section of the light of an image. With the combination of the five lens elements, the aperture stop 200 and the IR-filter 260, an image of the photographed object can be formed at the image plane 270.

TABLE 4

Optical data of this preferred embodiment
f = 4.05 mm, Fno = 2.60, HFOV = 34.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.194 | | | | |
| 2 | | 1.506920 (ASP) | 0.496 | | | | |
| | Lens 1 | | | Plastic | 1.544 | 55.9 | 2.85 |
| 3 | | 48.167000 (ASP) | 0.114 | | | | |
| 4 | | 12.736100 (ASP) | 0.250 | | | | |
| | Lens 2 | | | Plastic | 1.634 | 23.8 | −5.62 |
| 5 | | 2.763530 (ASP) | 0.490 | | | | |
| 6 | | −1.891750 (ASP) | 0.323 | | | | |
| | Lens 3 | | | Plastic | 1.634 | 23.8 | −9.92 |
| 7 | | −2.884420 (ASP) | 0.097 | | | | |
| 8 | | 5.273100 (ASP) | 0.477 | | | | |
| | Lens 4 | | | Plastic | 1.544 | 55.9 | 7.61 |
| 9 | | −18.719600 (ASP) | 0.548 | | | | |
| 10 | | 1.287060 (ASP) | 0.404 | | | | |
| | Lens 5 | | | Plastic | 1.544 | 55.9 | −147.94 |
| 11 | | 1.126680 (ASP) | 0.700 | | | | |
| 12 | | Plano | 0.300 | | | | |
| | IR-filter | | | Glass | 1.517 | 64.2 | — |
| 13 | | Plano | 0.624 | | | | |
| 14 | Image | Plano | — | | | | |

Note:
Reference wavelength is 587.6 nm. ASP stands for aspherical surfaces.

The optical data of this preferred embodiment are listed in Table 4, wherein the object-side surfaces and the image-side surfaces of the first lens element 210 to the fifth lens element 250 comply with the aspheric surface formula as given in Equation (11), and their aspheric coefficients are listed in Table 5 as follows:

TABLE 5

Aspheric coefficients of this preferred embodiment

| | Surface # | | | | |
|---|---|---|---|---|---|
| | 2 | 3 | 4 | 5 | 6 |
| k = | −2.90585E−01 | 9.96023E+00 | −2.00000E+01 | 2.49495E+00 | −7.07887E−01 |
| A4 = | 3.37557E−03 | −5.04837E−02 | −1.20356E−02 | 4.51108E−02 | −5.47589E−02 |
| A6 = | −1.50709E−02 | 1.96828E−02 | 8.29217E−02 | 4.24263E−02 | 2.55587E−02 |
| A8 = | 1.20870E−02 | −2.39993E−02 | −2.65473E−02 | 9.10951E−02 | −3.40833E−02 |
| A10 = | −5.71916E−02 | −3.33644E−02 | −6.80586E−03 | −1.65955E−01 | 4.12585E−02 |
| A12 = | | 1.23073E−02 | 4.80467E−02 | 1.64550E−01 | −2.83912E−02 |

| | Surface # | | | | |
|---|---|---|---|---|---|
| | 7 | 8 | 9 | 10 | 11 |
| k = | 3.10741E+00 | −7.17143E+00 | −2.00000E+01 | −3.88861E+00 | −3.41767E+00 |
| A4 = | −9.59479E−02 | −5.27367E−02 | −4.11369E−03 | −8.40582E−02 | −6.99738E−02 |
| A6 = | 7.13936E−02 | 9.03915E−03 | −6.85160E−03 | 7.75131E−03 | 1.19781E−02 |
| A8 = | −1.75694E−02 | −9.53755E−04 | 8.78711E−03 | 5.42326E−04 | −1.74102E−03 |
| A10 = | 1.27269E−02 | −6.83563E−04 | 2.08012E−04 | −8.36623E−05 | 1.87210E−05 |
| A12 = | 1.49857E−03 | 3.97972E−04 | −6.10219E−05 | | 1.98415E−05 |
| A14 = | | | | | −1.05144E−06 |

With reference to Table 4 and FIG. 2B for an optical lens for image pickup of this preferred embodiment, the optical lens for image pickup has a focal length f=4.05 (mm), an overall aperture stop value (f-number) Fno=2.60, and a half of the maximum view angle HFOV=34.3°. After the optical data of this preferred embodiment are calculated and derived, the optical imaging system for pickup satisfies related conditions as shown in Table 6 below, and the related symbols have been described above and thus will not be described again.

TABLE 6

Data of related relations of this preferred embodiment

| Relation | Data | Relation | Data |
|---|---|---|---|
| $v_1/v_2$ | 2.35 | $R_7/R_8$ | −0.28 |
| $CT_2/CT_3$ | 0.77 | $(R_3 + R_4)/(R_3 - R_4)$ | 1.55 |
| $CT_4/CT_5$ | 1.18 | $f/f_1$ | 1.42 |

TABLE 6-continued

Data of related relations of this preferred embodiment

| Relation | Data | Relation | Data |
|---|---|---|---|
| $R_4/f$ | 0.68 | $f/f_4$ | 0.53 |
| $f/R_8$ | −0.22 | | |

According to the optical data as shown in Table 4 and the series of aberration curves as shown in FIG. 2B, the optical lens for image pickup in accordance with this preferred embodiment of the present invention provides good correction results in aspects of the longitudinal spherical aberration, astigmatic field curving, and distortion.

Third Preferred Embodiment

Figure 3A:
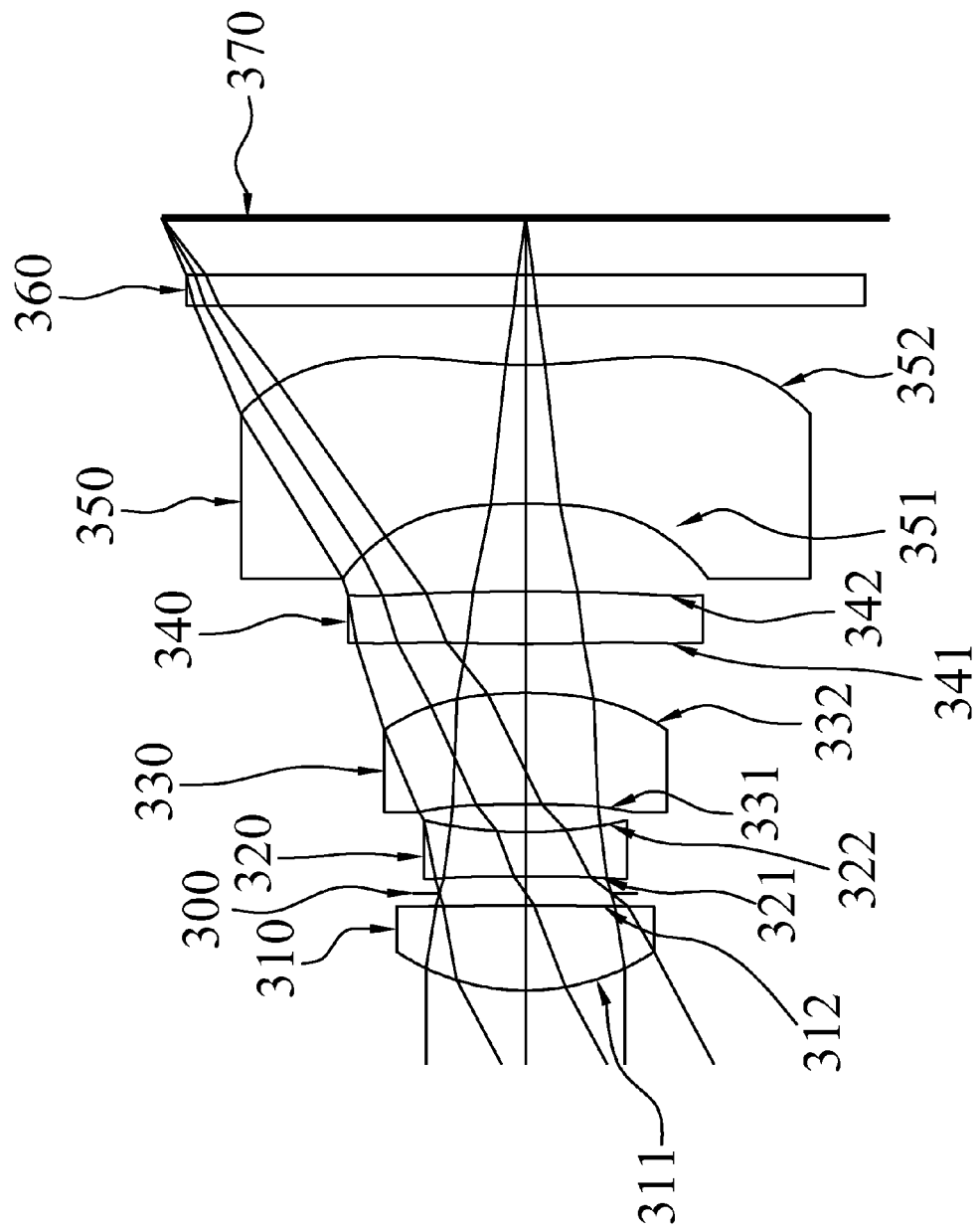
FIG. 3A is a schematic view of an optical lens for image pickup in accordance with the third preferred embodiment of the present invention.
Figure 3B:
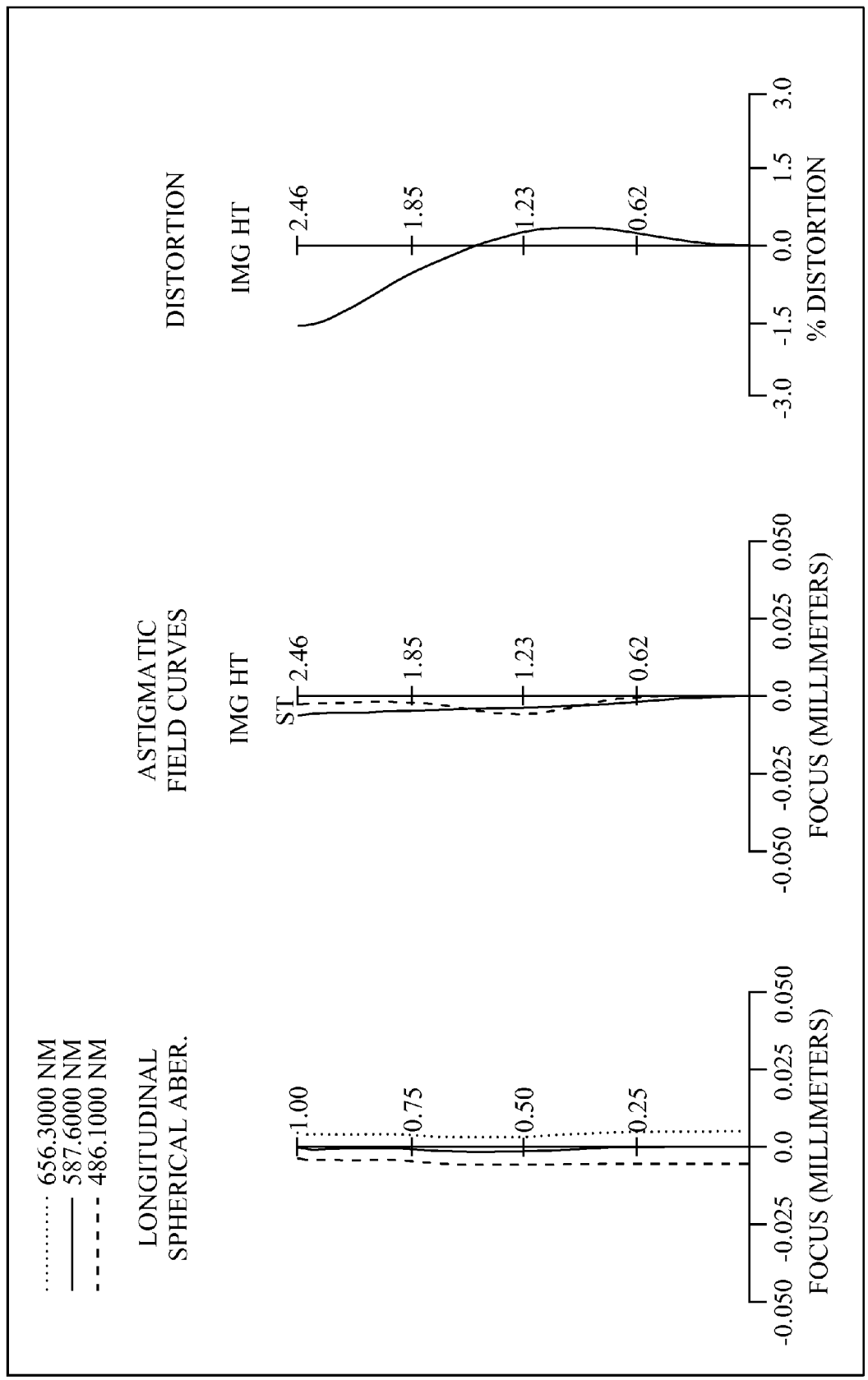
FIG. 3B is a schematic view of a series of aberration curves of the third preferred embodiment of the present invention.

With reference to FIGS. 3A and 3B for a schematic view and a series of aberration curves of an optical lens for image pickup in accordance with the third preferred embodiment of the present invention respectively, the optical lens for image pickup comprises five lens elements, an aperture stop 300 and an IR-filter 360. More specifically, the optical lens for image pickup of the present invention, sequentially arranged from an object side to an image side along an optical axis, comprises: a plastic first lens element 310 with positive refractive power, having a convex object-side surface 311 and a convex image-side surface 312, and both object-side surface 311 and image-side surface 312 being aspheric; an aperture stop 300; a plastic second lens element 320 with negative refractive power, having a concave object-side surface 321 and a concave image-side surface 322, and both object-side surface 321 and image-side surface 322 being aspheric; a plastic third lens element 330 with positive refractive power, having a concave object-side surface 331 and a convex image-side surface 332, and both object-side surface 331 and image-side surface 332 being aspheric; a plastic fourth lens element 340 with positive refractive power, having a convex object-side surface 341 and a convex image-side surface 342, and both object-side surface 341 and image-side surface 342 being aspheric; a plastic fifth lens element 350 with negative refractive power, having a concave object-side surface 351 and a concave image-side surface 352, and both object-side surface 351 and image-side surface 352 being aspheric, and at least one of the object-side surface 351 and the image-side surface 352 having at least one inflection point; and an IR-filter 360 made of panel glass for adjusting a wavelength section of the light of an image. With the combination of the five lens elements, the aperture stop 300 and the IR-filter 360, an image of the photographed object can be formed at the image plane 370.

TABLE 7

Optical data of this preferred embodiment
f = 4.71 mm, Fno = 3.50, HFOV = 28.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | | 1.614961 (ASP) | 0.575 | | | | |
| | Lens 1 | | | Plastic | 1.544 | 55.9 | 2.91 |
| 2 | | −75.802175 (ASP) | 0.082 | | | | |
| 3 | Ape. Stop | Plano | 0.115 | | | | |
| 4 | | −41.465666 (ASP) | 0.300 | | | | |
| | Lens 2 | | | Plastic | 1.634 | 23.8 | −3.88 |
| 5 | | 2.622202 (ASP) | 0.189 | | | | |
| 6 | | −12.279317 (ASP) | 0.755 | | | | |
| | Lens 3 | | | Plastic | 1.544 | 55.9 | 6.37 |
| 7 | | −2.761231 (ASP) | 0.333 | | | | |
| 8 | | 11.494253 (ASP) | 0.353 | | | | |
| | Lens 4 | | | Plastic | 1.607 | 26.6 | 15.55 |
| 9 | | −52.356021 (ASP) | 0.596 | | | | |
| 10 | | −4.528541 (ASP) | 0.940 | | | | |
| | Lens 5 | | | Plastic | 1.535 | 56.3 | −3.42 |
| 11 | | 3.292141 (ASP) | 0.400 | | | | |
| 12 | | Plano | 0.210 | | | | |
| | IR-filter | | | Glass | 1.517 | 64.2 | — |
| 13 | | Plano | 0.384 | | | | |
| 14 | Image | Plano | — | | | | |

Note:
Reference wavelength is 587.6 nm. ASP stands for aspherical surfaces.

The optical data of this preferred embodiment are listed in Table 7, wherein the object-side surfaces and the image-side surfaces of the first lens element 310 to the fifth lens element 350 comply with the aspheric surface formula as given in Equation (11), and their aspheric coefficients are listed in Table 8 as follows:

TABLE 8

Aspheric coefficients of this preferred embodiment

| | Surface # | | | | |
|---|---|---|---|---|---|
| | 1 | 2 | 4 | 5 | 6 |
| k = | 3.77232E−01 | 2.00000E+01 | −2.00000E+01 | 2.83420E+00 | 9.93468E+00 |
| A4 = | −5.22870E−03 | −1.75425E−02 | −1.21265E−01 | −1.29426E−01 | −9.55645E−02 |
| A6 = | 6.96863E−03 | 1.17248E−02 | 1.55859E−01 | 9.41042E−02 | −1.99603E−01 |
| A8 = | −2.65604E−02 | 4.20783E−02 | −1.90005E−01 | 7.51996E−03 | 5.27565E−01 |
| A10 = | 4.52653E−02 | −1.18182E−01 | 3.92269E−01 | −3.64954E−02 | −1.18794E+00 |
| A12 = | −3.33437E−02 | 7.28858E−02 | −4.44021E−01 | 3.07005E−01 | 1.43618E+00 |

| | Surface # | | | | |
|---|---|---|---|---|---|
| | 7 | 8 | 9 | 10 | 11 |
| k = | −3.43499E+00 | −1.99975E+01 | −1.97680E+01 | −1.83019E+01 | −1.53251E+01 |
| A4 = | −1.11705E−01 | −4.79359E−02 | −3.18944E−02 | −2.08847E−01 | −8.60770E−02 |
| A6 = | −4.64337E−02 | −4.82513E−02 | −3.06928E−02 | 3.31188E−02 | 2.54167E−02 |
| A8 = | 5.15033E−02 | 8.33360E−02 | 7.70559E−02 | 1.41605E−02 | −6.30106E−03 |
| A10 = | −9.87530E−03 | −1.77482E−02 | −4.24349E−02 | −3.43286E−03 | 7.08448E−04 |
| A12 = | 2.62131E−03 | −1.07602E−02 | 1.21395E−02 | −4.42682E−03 | 2.17917E−05 |
| A14 = | | 2.96551E−03 | −2.39441E−03 | −1.10330E−03 | −2.35145E−05 |
| A16 = | | | | 8.47509E−04 | 2.64648E−06 |

With reference to Table 7 and FIG. 31B for an optical lens for image pickup of this preferred embodiment, the optical lens for image pickup has a focal length f=4.71 (mm), an overall aperture stop value (f-number) Fno=3.50, and a half of the maximum view angle HFOV=28.0°. After the optical data of this preferred embodiment are calculated and derived, the optical imaging system for pickup satisfies related conditions as shown in Table 9 below, and the related symbols have been described above and thus will not be described again.

TABLE 9

Data of related relations of this preferred embodiment

| Relation | Data | Relation | Data |
|---|---|---|---|
| $v_1/v_2$ | 2.35 | $R_7/R_8$ | −0.22 |
| $CT_2/CT_3$ | 0.40 | $(R_3 + R_4)/(R_3 − R_4)$ | 0.88 |
| $CT_4/CT_5$ | 0.38 | $f/f_1$ | 1.62 |
| $R_4/f$ | 0.56 | $f/f_4$ | 0.30 |
| $f/R_8$ | −0.09 | | |

According to the optical data as shown in Table 7 and the series of aberration curves as shown in FIG. 3B, the optical lens for image pickup in accordance with this preferred embodiment of the present invention provides good correction results in aspects of the longitudinal spherical aberration, astigmatic field curving, and distortion.

Fourth Preferred Embodiment

Figure 4A:
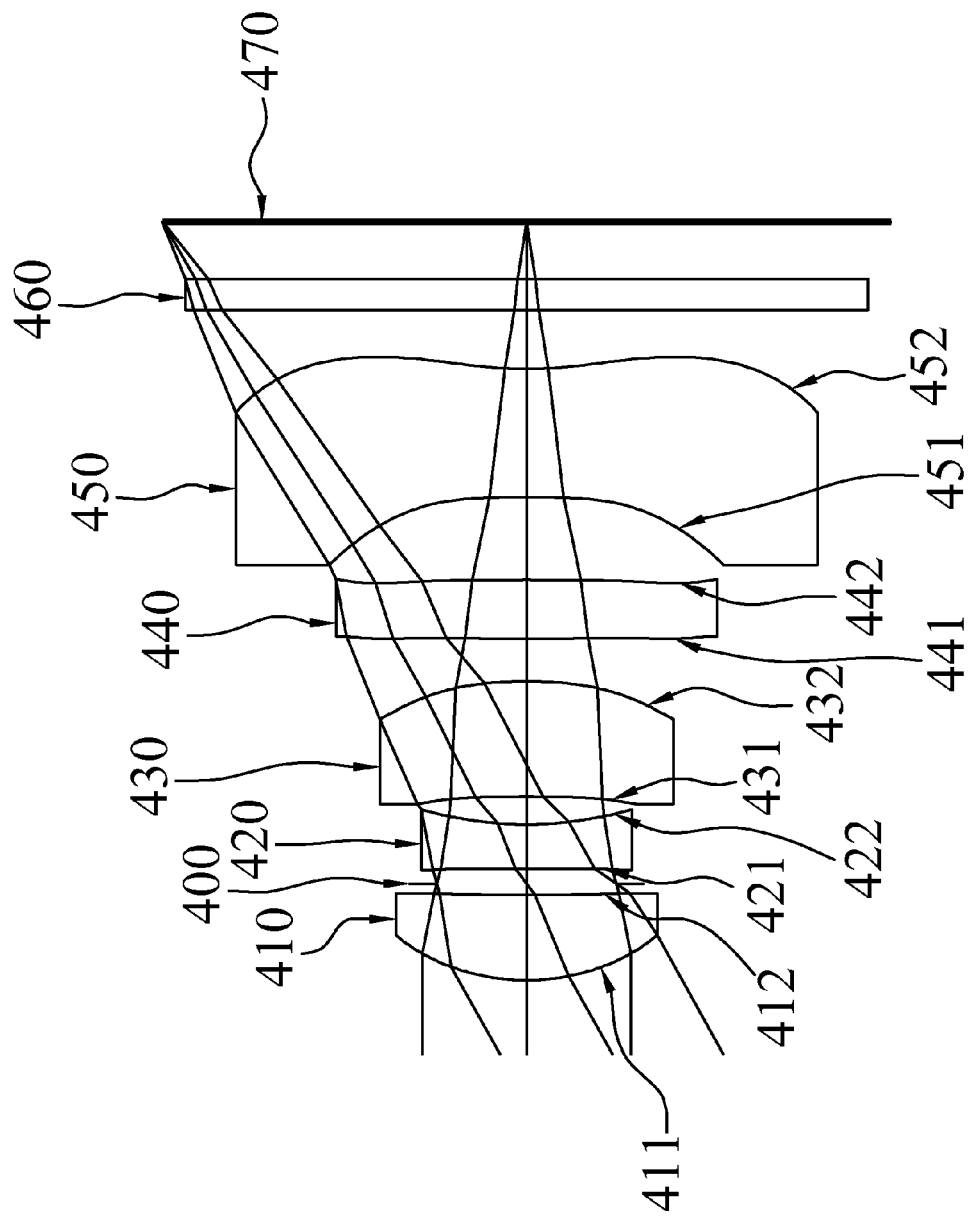
FIG. 4A is a schematic view of an optical lens for image pickup in accordance with the fourth preferred embodiment of the present invention.
Figure 4B:
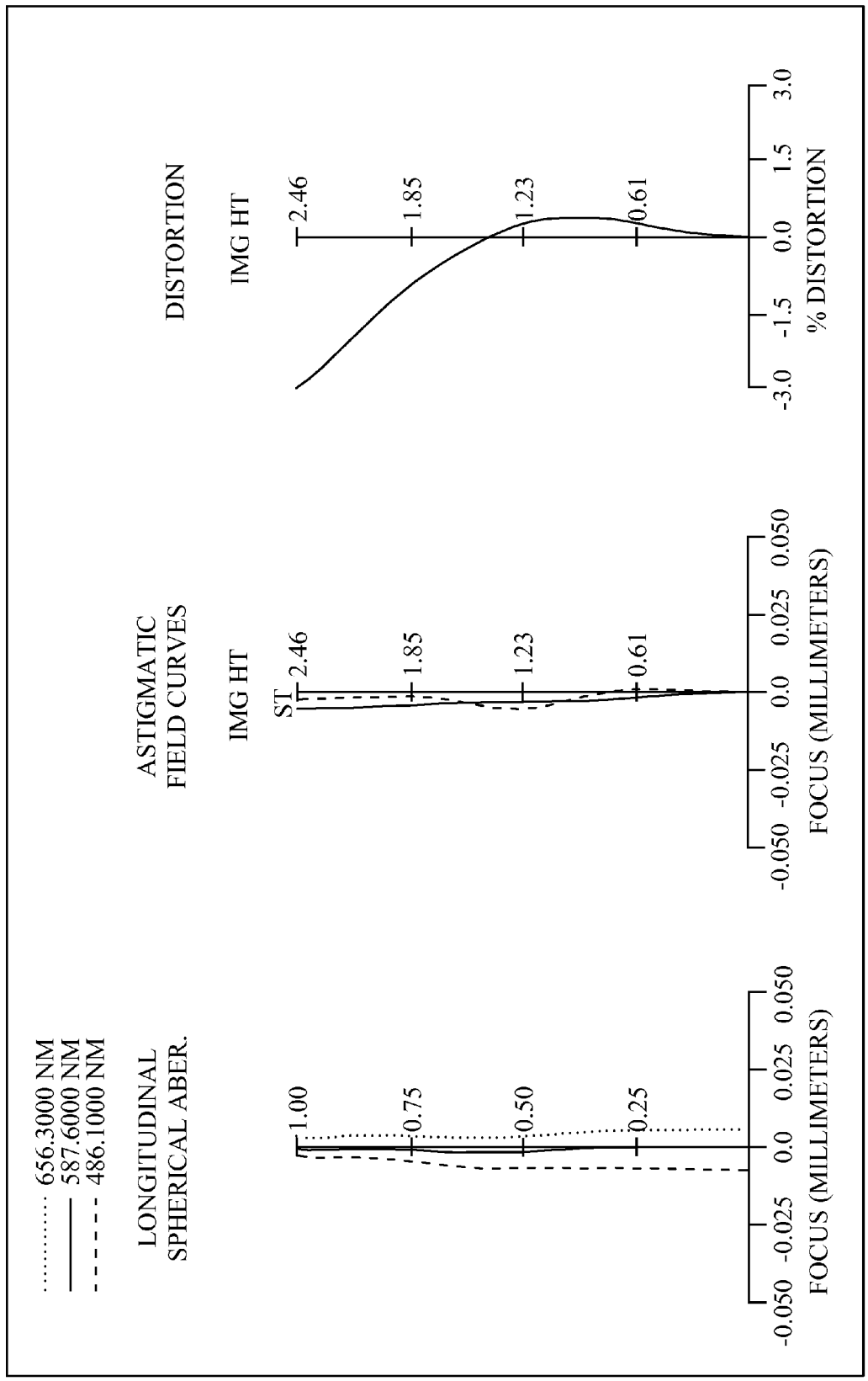
FIG. 4B is a schematic view of a series of aberration curves of the fourth preferred embodiment of the present invention.

With reference to FIGS. 4A and 4B for a schematic view and a series of aberration curves of an optical lens for image pickup in accordance with the fourth preferred embodiment of the present invention respectively, the optical lens for image pickup comprises five lens elements, an aperture stop 400 and an IR-filter 460. More specifically, the optical lens for image pickup of the present invention, sequentially arranged from an object side to an image side along an optical axis, comprises: a plastic first lens element 410 with positive refractive power, having a convex object-side surface 411 and a concave image-side surface 412, and both object-side surface 411 and image-side surface 412 being aspheric; an aperture stop 400; a plastic second lens element 420 with negative refractive power, having a convex object-side surface 421 and a concave image-side surface 422, and both object-side surface 421 and image-side surface 422 being aspheric; a plastic third lens element 430 with positive refractive power, having a concave object-side surface 431 and a convex image-side surface 432, and both object-side surface 431 and image-side surface 432 being aspheric; a plastic fourth lens element 440 with positive refractive power, having a convex object-side surface 441 and a convex image-side surface 442, and both object-side surface 441 and image-side surface 442 being aspheric; a plastic fifth lens element 450 with negative refractive power, having a concave object-side surface 451 and a concave image-side surface 452, and both object-side surface 451 and image-side surface 452 being aspheric, and at least one of the object-side surface 451 and the image-side surface 452 having at least one inflection point; and an IR-filter 460 made of panel glass for adjusting a wavelength section of the light of an image. With the combination of the five lens elements, the aperture stop 400 and the IR-filter 460, an image of the photographed object can be formed at the image plane 470.

TABLE 10

Optical data of this preferred embodiment
f = 4.53 mm, Fno = 3.22, HFOV = 29.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.514160 (ASP) | 0.577 | Plastic | 1.544 | 55.9 | 3.01 |
| 2 | | 17.543860 (ASP) | 0.074 | | | | |
| 3 | Ape. Stop | Plano | 0.102 | | | | |
| 4 | Lens 2 | 17.737217 (ASP) | 0.300 | Plastic | 1.634 | 23.8 | −4.01 |
| 5 | | 2.208734 (ASP) | 0.189 | | | | |
| 6 | Lens 3 | −15.360763 (ASP) | 0.780 | Plastic | 1.544 | 55.9 | 6.13 |
| 7 | | −2.790952 (ASP) | 0.287 | | | | |
| 8 | Lens 4 | 12.987013 (ASP) | 0.400 | Plastic | 1.607 | 26.6 | 18.72 |
| 9 | | −90.090090 (ASP) | 0.559 | | | | |
| 10 | Lens 5 | −10.474284 (ASP) | 0.867 | Plastic | 1.535 | 56.3 | −3.79 |
| 11 | | 2.581608 (ASP) | 0.400 | | | | |
| 12 | IR-filter | Plano | 0.210 | Glass | 1.517 | 64.2 | — |
| 13 | | Plano | 0.385 | | | | |
| 14 | Image | Plano | — | | | | |

Note:
Reference wavelength is 587.6 nm. ASP stands for aspherical surfaces.

The optical data of this preferred embodiment are listed in Table 10, wherein the object-side surfaces and the image-side surfaces of the first lens element 410 to the fifth lens element 450 comply with the aspheric surface formula as given in Equation (11), and their aspheric coefficients are listed in Table 11 as follows:

TABLE 11

Aspheric coefficients of this preferred embodiment

| | Surface # | | | | |
|---|---|---|---|---|---|
| | 1 | 2 | 4 | 5 | 6 |
| k = | 4.33467E−01 | −1.55764E+01 | −2.22007E+02 | 1.36817E+00 | −2.00000E+01 |
| A4 = | −4.31086E−03 | −1.92155E−02 | −1.46656E−01 | −1.38578E−01 | −8.33916E−02 |
| A6 = | 1.17717E−02 | 2.62316E−02 | 1.43155E−01 | 8.33036E−02 | −2.05246E−01 |
| A8 = | −2.12038E−02 | 3.79660E−02 | −1.78028E−01 | −1.57603E−02 | 5.19052E−01 |
| A10 = | 3.66170E−02 | −8.77626E−02 | 3.53989E−01 | −2.21605E−02 | −1.21057E+00 |
| A12 = | −1.25855E−02 | 4.73149E−02 | −4.03871E−01 | 2.34487E−01 | 1.39276E+00 |

| | Surface # | | | | |
|---|---|---|---|---|---|
| | 7 | 8 | 9 | 10 | 11 |
| k = | −3.38929E+00 | −2.00000E+01 | 2.00000E+01 | −2.00000E+01 | −1.05408E+01 |
| A4 = | −1.09889E−01 | −4.83088E−02 | −3.12307E−02 | −1.98321E−01 | −9.13884E−02 |
| A6 = | −3.96557E−02 | −4.77036E−02 | −2.99784E−02 | 3.36464E−02 | 2.78482E−02 |
| A8 = | 5.13883E−02 | 8.46369E−02 | 7.67749E−02 | 1.88927E−02 | −6.62067E−03 |
| A10 = | −7.41303E−03 | −1.69914E−02 | −4.28530E−02 | −2.75259E−03 | 7.01131E−04 |
| A12 = | 1.00431E−02 | −1.09091E−02 | 1.23684E−02 | −3.93993E−03 | 2.85277E−05 |
| A14 = | | 3.31574E−03 | −1.91642E−03 | −8.14534E−04 | −2.24962E−05 |
| A16 = | | | | 8.67020E−04 | 2.18414E−06 |

With reference to Table 10 and FIG. 4B for an optical lens for image pickup of this preferred embodiment, the optical lens for image pickup has a focal length f=4.53 (mm), an overall aperture stop value (f-number) Fno=3.22, and a half of the maximum view angle HFOV=29.2°. After the optical data of this preferred embodiment are calculated and derived, the optical imaging system for pickup satisfies related conditions as shown in Table 12 below, and the related symbols have been described above and thus will not be described again.

TABLE 12

Data of related relations of this preferred embodiment

| Relation | Data | Relation | Data |
|---|---|---|---|
| $v_1/v_2$ | 2.35 | $R_7/R_8$ | −0.14 |
| $CT_2/CT_3$ | 0.38 | $(R_3 + R_4)/(R_3 − R_4)$ | 1.28 |
| $CT_4/CT_5$ | 0.46 | $f/f_1$ | 1.51 |

TABLE 12-continued

Data of related relations of this preferred embodiment

| Relation | Data | Relation | Data |
|---|---|---|---|
| $R_4/f$ | 0.49 | $f/f_4$ | 0.24 |
| $f/R_8$ | −0.05 | | |

According to the optical data as shown in Table 10 and the series of aberration curves as shown in FIG. 4B, the optical lens for image pickup in accordance with this preferred embodiment of the present invention provides good correction results in aspects of the longitudinal spherical aberration, astigmatic field curving, and distortion.

Fifth Preferred Embodiment

Figure 5A:
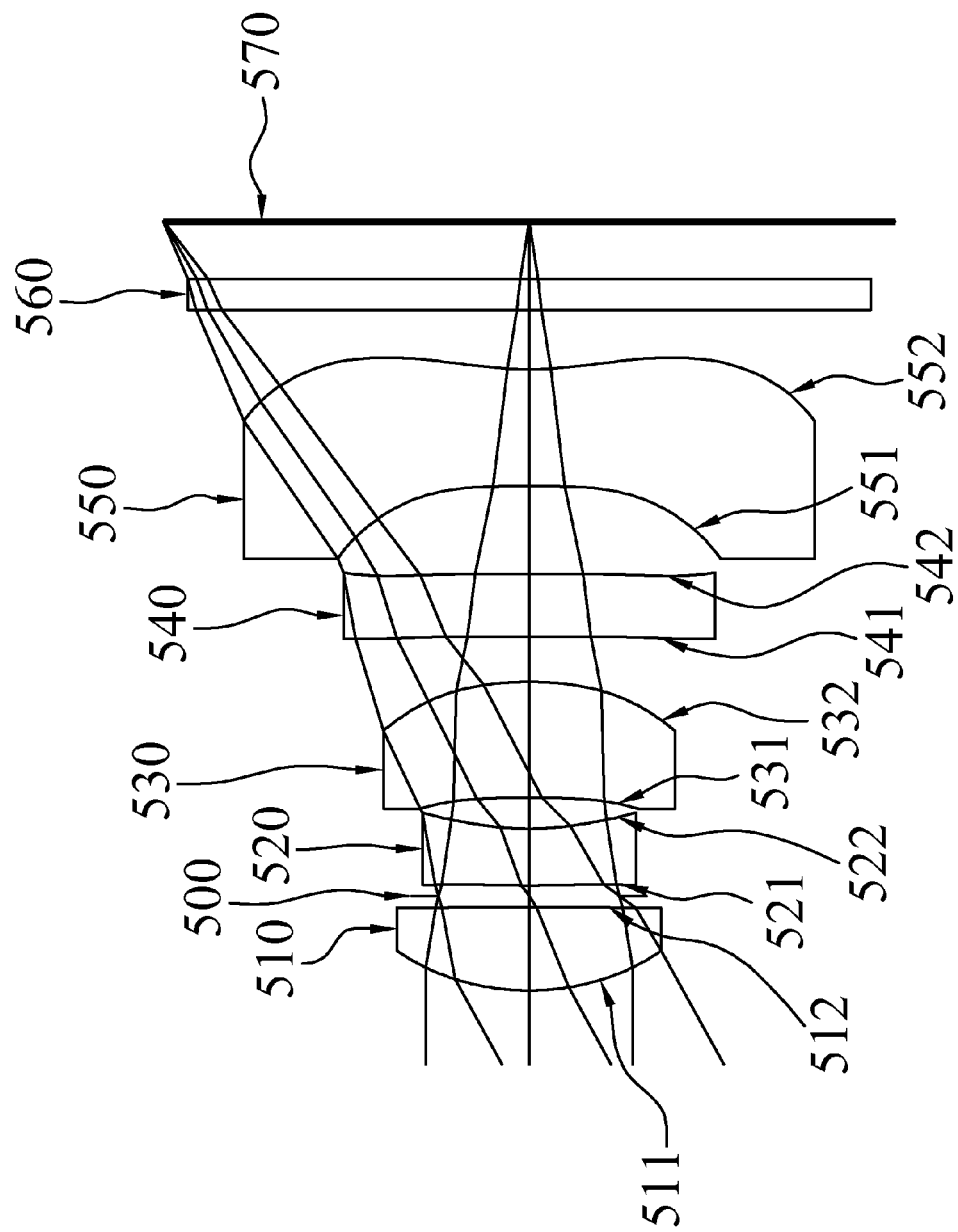
FIG. 5A is a schematic view of an optical lens for image pickup in accordance with the fifth preferred embodiment of the present invention.
Figure 5B:
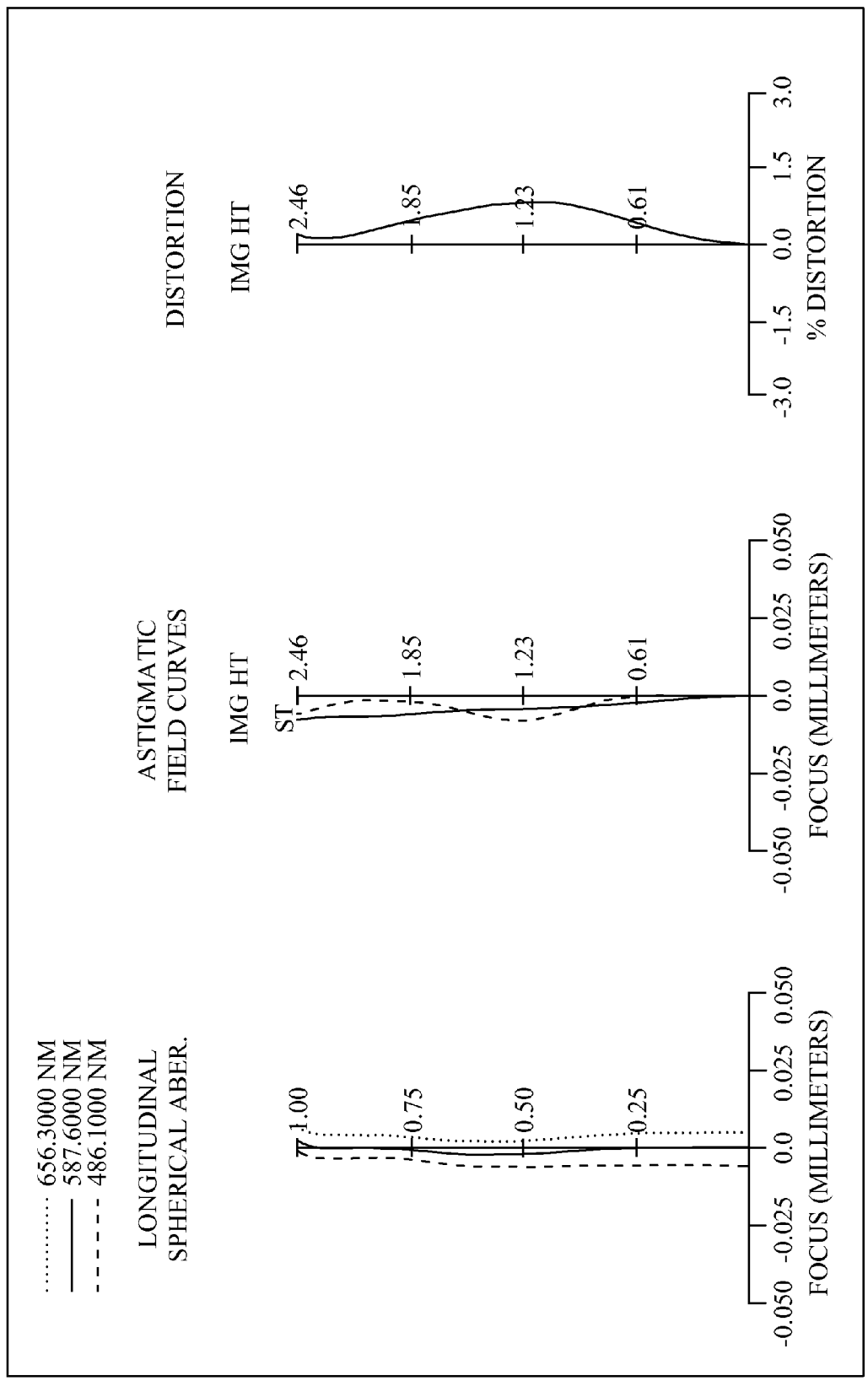
FIG. 5B is a schematic view of a series of aberration curves of the fifth preferred embodiment of the present invention.

With reference to FIGS. 5A and 5B for a schematic view and a series of aberration curves of an optical lens for image pickup in accordance with the fifth preferred embodiment of the present invention respectively, the optical lens for image pickup comprises five lens elements, an aperture stop 500 and an IR-filter 560. More specifically, the optical lens for image pickup of the present invention, sequentially arranged from an object side to an image side along an optical axis, comprises: a plastic first lens element 510 with positive refractive power, having a convex object-side surface 511 and a convex image-side surface 512, and both object-side surface 511 and image-side surface 512 being aspheric; an aperture stop 500; a plastic second lens element 520 with negative refractive power, having a convex object-side surface 521 and a concave image-side surface 522, and both object-side surface 521 and image-side surface 522 being aspheric; a plastic third lens element 530 with positive refractive power, having a concave object-side surface 531 and a convex image-side surface 532, and both object-side surface 531 and image-side surface 532 being aspheric; a plastic fourth lens element 540 with positive refractive power, having a convex object-side surface 541 and a convex image-side surface 542, and both object-side surface 541 and image-side surface 542 being aspheric; a plastic fifth lens element 550 with negative refractive power, having a concave object-side surface 551 and a concave image-side surface 552, and both object-side surface 551 and image-side surface 552 being aspheric, and at least one of the object-side surface 551 and the image-side surface 552 having at least one inflection point; and an IR-filter 560 made of panel glass for adjusting a wavelength section of the light of an image. With the combination of the five lens elements, the aperture stop 500 and the IR-filter 560, an image of the photographed object can be formed at the image plane 570.

TABLE 13

Optical data of this preferred embodiment
f = 4.48 mm, Fno = 3.22, HFOV = 28.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.708317 (ASP) | 0.562 | Plastic | 1.544 | 55.9 | 3.06 |
| 2 | | −58.917670 (ASP) | 0.073 | | | | |
| 3 | Ape. Stop | Plano | 0.074 | | | | |
| 4 | | 8.998329 (ASP) | 0.382 | | | | |
| | Lens 2 | | | Plastic | 1.634 | 23.8 | −4.15 |
| 5 | | 2.001436 (ASP) | 0.209 | | | | |
| 6 | | −7.567571 (ASP) | 0.780 | | | | |
| | Lens 3 | | | Plastic | 1.535 | 56.3 | 5.22 |
| 7 | | −2.111134 (ASP) | 0.304 | | | | |
| 8 | | 35.714286 (ASP) | 0.425 | | | | |
| | Lens 4 | | | Plastic | 1.607 | 26.6 | 35.47 |
| 9 | | −54.020176 (ASP) | 0.590 | | | | |
| 10 | | −12.568290 (ASP) | 0.786 | | | | |
| | Lens 5 | | | Plastic | 1.535 | 56.3 | −3.76 |
| 11 | | 2.442242 (ASP) | 0.400 | | | | |
| 12 | | Plano | 0.210 | | | | |
| | IR-filter | | | Glass | 1.517 | 64.2 | — |
| 13 | | Plano | 0.385 | | | | |
| 14 | Image | Plano | — | | | | |

Note:
Reference wavelength is 587.6 nm. ASP stands for aspherical surfaces.

The optical data of this preferred embodiment are listed in Table 13, wherein the object-side surfaces and the image-side surfaces of the first lens element 510 to the fifth lens element 550 comply with the aspheric surface formula as given in Equation (11), and their aspheric coefficients are listed in Table 14 as follows:

TABLE 14

Aspheric coefficients of this preferred embodiment

| | Surface # | | | | |
|---|---|---|---|---|---|
| | 1 | 2 | 4 | 5 | 6 |
| k = | 5.01344E−01 | 2.00000E+01 | −3.37287E+01 | 6.38742E−01 | 8.04940E+00 |
| A4 = | 5.80923E−04 | −1.71929E−02 | −1.44558E−01 | −1.51931E−01 | −9.03802E−02 |
| A6 = | 1.34203E−02 | 3.53134E−02 | 1.29822E−01 | 5.71148E−02 | −2.40787E−01 |

TABLE 14-continued

Aspheric coefficients of this preferred embodiment

| | | | | | |
|---|---|---|---|---|---|
| A8 = | −2.00447E−02 | 5.17815E−02 | −1.90141E−01 | −3.69484E−02 | 5.80249E−01 |
| A10 = | 4.06848E−02 | −1.61866E−01 | 3.86920E−01 | 4.24833E−02 | −1.41041E+00 |
| A12 = | −2.04723E−02 | 1.08002E−01 | −4.36764E−01 | 1.50909E−01 | 1.57713E+00 |

| | Surface # | | | | |
|---|---|---|---|---|---|
| | 7 | 8 | 9 | 10 | 11 |
| k = | −2.16113E+00 | −2.00000E+01 | 2.00000E+01 | −2.00000E+01 | −1.11424E+01 |
| A4 = | −1.17821E−01 | −3.53736E−02 | −1.69724E−02 | −2.17953E−01 | −9.99872E−02 |
| A6 = | −4.73365E−02 | −4.98915E−02 | −3.10401E−02 | 3.93066E−02 | 2.98735E−02 |
| A8 = | 3.98001E−02 | 8.36341E−02 | 7.61110E−02 | 1.48074E−02 | −6.86161E−03 |
| A10 = | −2.31086E−03 | −1.80145E−02 | −4.39385E−02 | −3.43509E−03 | 6.32190E−04 |
| A12 = | 3.92033E−03 | −1.20726E−02 | 1.22644E−02 | −3.48487E−03 | 3.29092E−05 |
| A14 = | | 3.69488E−03 | −1.88950E−03 | −7.06487E−04 | −2.07173E−05 |
| A16 = | | | | 4.15543E−04 | 1.55927E−06 |

With reference to Table 13 and FIG. 5B for an optical lens for image pickup of this preferred embodiment, the optical lens for image pickup has a focal length f=4.48 (mm), an overall aperture stop value (f-number) Fno=3.22, and a half of the maximum view angle HFOV=28.7°. After the optical data of this preferred embodiment are calculated and derived, the optical imaging system for pickup satisfies related conditions as shown in Table 15 below, and the related symbols have been described above and thus will not be described again.

TABLE 15

Data of related relations of this preferred embodiment

| Relation | Data | Relation | Data |
|---|---|---|---|
| $v_1/v_2$ | 2.35 | $R_7/R_8$ | −0.66 |
| $CT_2/CT_3$ | 0.49 | $(R_3 + R_4)/(R_3 - R_4)$ | 1.57 |
| $CT_4/CT_5$ | 0.54 | $f/f_1$ | 1.47 |
| $R_4/f$ | 0.45 | $f/f_4$ | 0.13 |
| $f/R_8$ | −0.08 | | |

According to the optical data as shown in Table 13 and the series of aberration curves as shown in FIG. 5B, the optical lens for image pickup in accordance with this preferred embodiment of the present invention provides good correction results in aspects of the longitudinal spherical aberration, astigmatic field curving, and distortion.

Sixth Preferred Embodiment

Figure 6A:
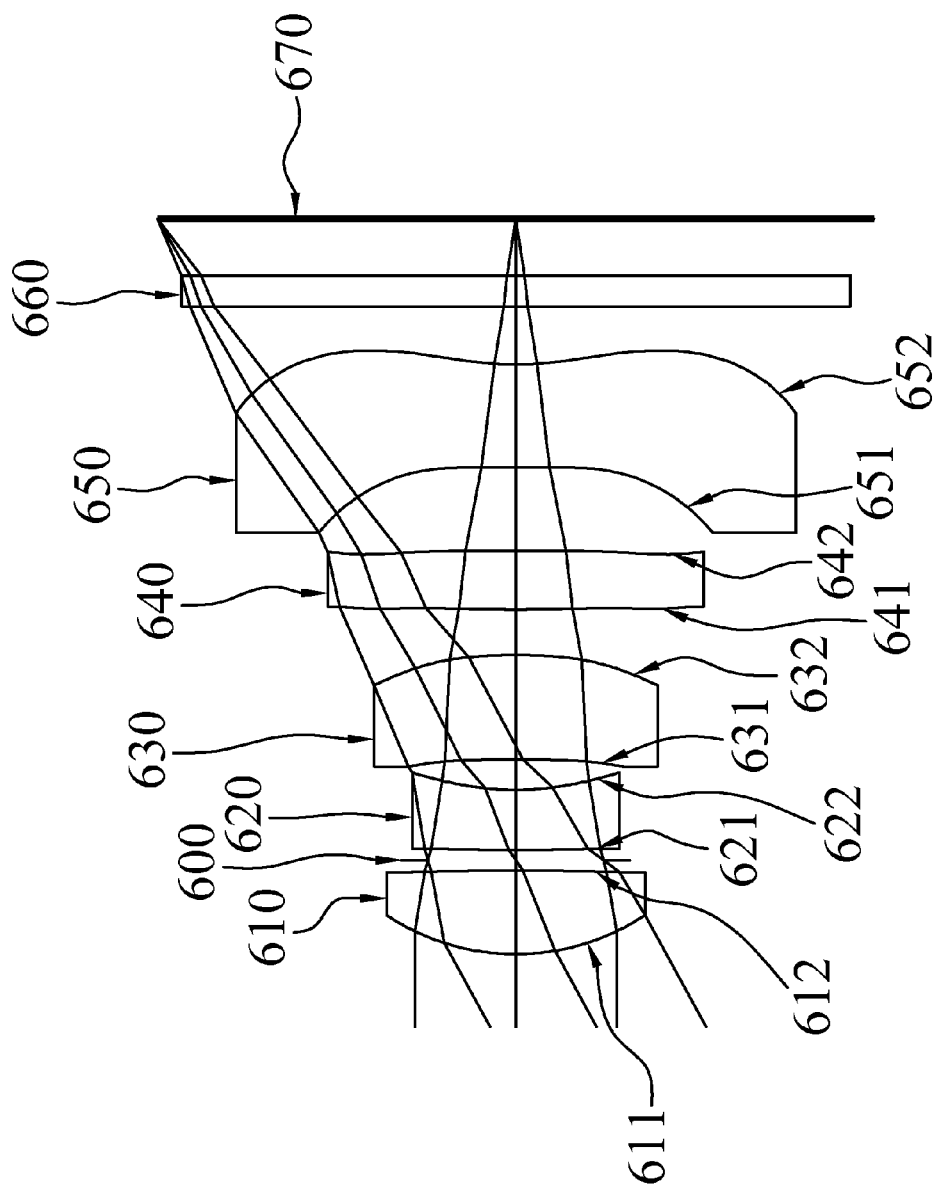
FIG. 6A is a schematic view of an optical lens for image pickup in accordance with the sixth preferred embodiment of the present invention.
Figure 6B:
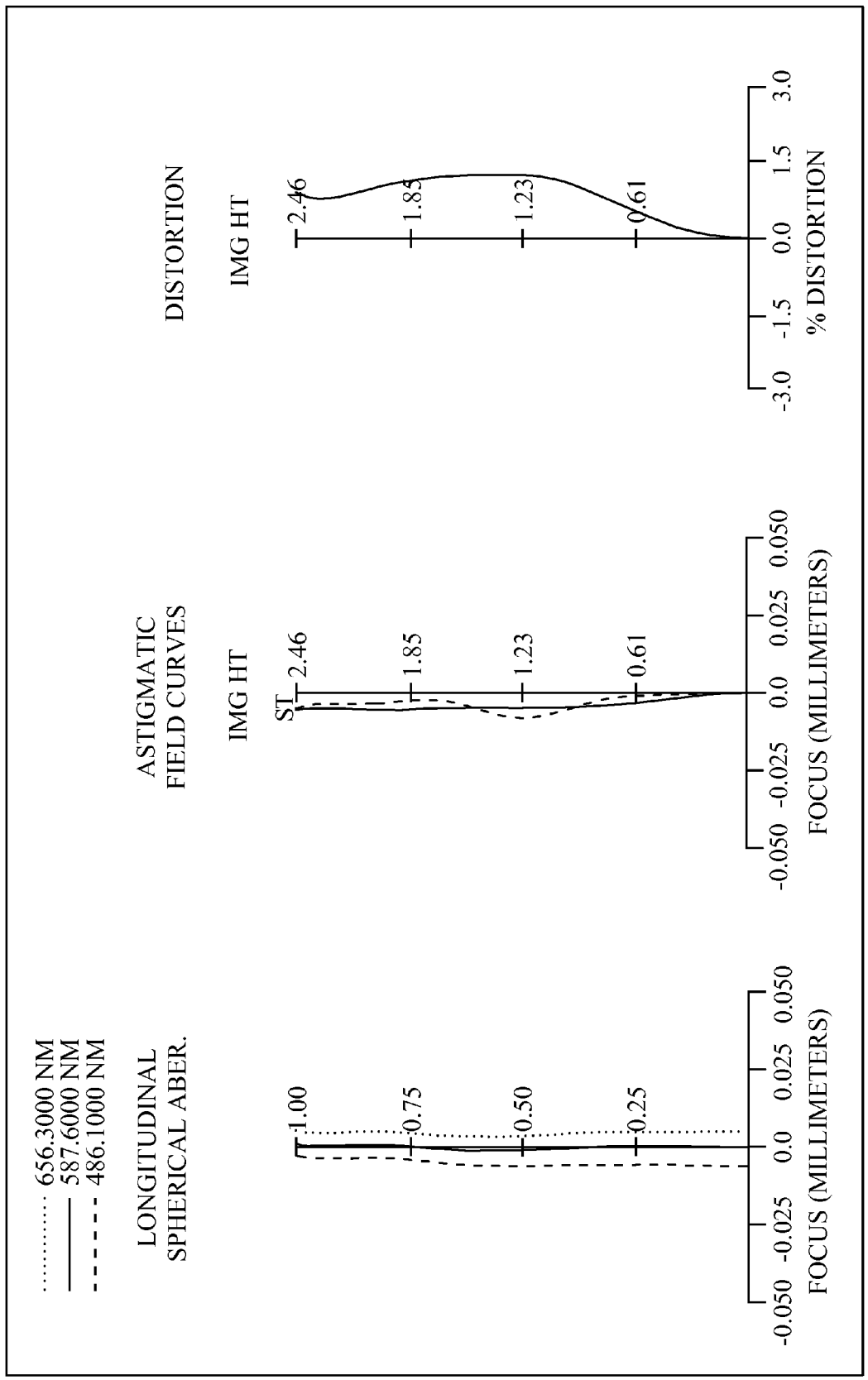
FIG. 6B is a schematic view of a series of aberration curves of the sixth preferred embodiment of the present invention.

With reference to FIGS. 6A and 6B for a schematic view and a series of aberration curves of an optical lens for image pickup in accordance with the sixth preferred embodiment of the present invention respectively, the optical lens for image pickup comprises five lens elements, an aperture stop 600 and an IR-filter 660. More specifically, the optical lens for image pickup of the present invention, sequentially arranged from an object side to an image side along an optical axis, comprises: a plastic first lens element 610 with positive refractive power, having a convex object-side surface 611 and a convex image-side surface 612, and both object-side surface 611 and image-side surface 612 being aspheric; an aperture stop 600; a plastic second lens element 620 with negative refractive power, having a convex object-side surface 621 and a concave image-side surface 622, and both object-side surface 621 and image-side surface 622 being aspheric; a plastic third lens element 630 with positive refractive power, having a concave object-side surface 631 and a convex image-side surface 632, and both object-side surface 631 and image-side surface 632 being aspheric; a plastic fourth lens element 640 with positive refractive power, having a convex object-side surface 641 and a convex image-side surface 642, and both object-side surface 641 and image-side surface 642 being aspheric; a plastic fifth lens element 650 with negative refractive power, having a convex object-side surface 651 and a concave image-side surface 652, and both object-side surface 651 and image-side surface 652 being aspheric, and at least one of the object-side surface 651 and the image-side surface 652 having at least one inflection point; and an IR-filter 660 made of panel glass for adjusting a wavelength section of the light of an image. With the combination of the five lens elements, the aperture stop 600 and the IR-filter 660, an image of the photographed object can be formed at the image plane 670.

TABLE 16

Optical data of this preferred embodiment
f = 4.45 mm, Fno = 3.22, HFOV = 28.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | | 1.638650 (ASP) | 0.573 | | | | |
| | Lens 1 | | | Plastic | 1.544 | 55.9 | 2.86 |
| 2 | | −27.469360 (ASP) | 0.070 | | | | |
| 3 | Ape. Stop | Plano | 0.071 | | | | |
| 4 | | 10.089853 (ASP) | 0.414 | | | | |
| | Lens 2 | | | Plastic | 1.634 | 23.8 | −3.80 |
| 5 | | 1.911857 (ASP) | 0.209 | | | | |
| 6 | | −14.310631 (ASP) | 0.718 | | | | |
| | Lens 3 | | | Plastic | 1.535 | 56.3 | 8.14 |

TABLE 16-continued

Optical data of this preferred embodiment
f = 4.45 mm, Fno = 3.22, HFOV = 28.7 deg.

| Surface # | | Curvature Radius | Thickness | Material | Index | Abbe # | Focal length |
|---|---|---|---|---|---|---|---|
| 7 | | −3.395472 (ASP) | 0.313 | | | | |
| 8 | | 10.989011 (ASP) | 0.404 | | | | |
| | Lens 4 | | | Plastic | 1.607 | 26.6 | 16.15 |
| 9 | | −90.090090 (ASP) | 0.571 | | | | |
| 10 | | 17.111567 (ASP) | 0.707 | | | | |
| | Lens 5 | | | Plastic | 1.544 | 55.9 | −4.49 |
| 11 | | 2.104890 (ASP) | 0.400 | | | | |
| 12 | | Plano | 0.210 | | | | |
| | IR-filter | | | Glass | 1.517 | 64.2 | — |
| 13 | | Plano | 0.390 | | | | |
| 14 | Image | Plano | — | | | | |

Note:
Reference wavelength is 587.6 nm. ASP stands for aspherical surfaces.

The optical data of this preferred embodiment are listed in Table 16, wherein the object-side surfaces and the image-side surfaces of the first lens element 610 to the fifth lens element 650 comply with the aspheric surface formula as given in Equation (11), and their aspheric coefficients are listed in Table 17 as follows:

TABLE 17

Aspheric coefficients of this preferred embodiment

| Surface # | | | | | |
|---|---|---|---|---|---|
| | 1 | 2 | 4 | 5 | 6 |
| k = | 3.66023E−01 | −1.99951E+01 | 6.32623E+01 | 1.09364E+00 | −2.00000E+01 |
| A4 = | −4.85078E−03 | −1.45884E−02 | −1.20935E−01 | −1.37739E−01 | −8.80160E−02 |
| A6 = | 7.11596E−03 | 3.11616E−02 | 1.28812E−01 | 6.72334E−02 | −1.82389E−01 |
| A8 = | −2.21036E−02 | 2.27265E−02 | −2.13314E−01 | −2.80833E−02 | 5.65492E−01 |
| A10 = | 3.65925E−02 | −1.18546E−01 | 3.89854E−01 | −2.97941E−02 | −1.27337E+00 |
| A12 = | −2.38189E−02 | 8.90471E−02 | −3.85898E−01 | 2.62832E−01 | 1.45486E+00 |

| Surface # | | | | | |
|---|---|---|---|---|---|
| | 7 | 8 | 9 | 10 | 11 |
| k = | −4.23008E+00 | −1.99999E+01 | 2.00000E+01 | 1.65493E+00 | −8.32051E+00 |
| A4 = | −1.09047E−01 | −4.69959E−02 | −3.52395E−02 | −2.34936E−01 | −1.13465E−01 |
| A6 = | −3.47073E−02 | −5.09155E−02 | −2.80445E−02 | 3.97669E−02 | 3.53511E−02 |
| A8 = | 5.54561E−02 | 8.45530E−02 | 7.72181E−02 | 2.05252E−02 | −7.80932E−03 |
| A10 = | −2.70381E−03 | −1.65643E−02 | −4.37089E−02 | −3.36388E−03 | 6.59440E−04 |
| A12 = | 1.01805E−02 | −1.12117E−02 | 1.21480E−02 | −4.20622E−03 | 3.74149E−05 |
| A14 = | | 3.44416E−03 | −1.77911E−03 | −7.56833E−04 | −2.24339E−05 |
| A16 = | | | | 6.98503E−04 | 1.97035E−06 |

With reference to Table 16 and FIG. 6B for an optical lens for image pickup of this preferred embodiment, the optical lens for image pickup has a focal length f=4.45 (mm), an overall aperture stop value (f-number) Fno=3.22, and a half of the maximum view angle HFOV=28.7°. After the optical data of this preferred embodiment are calculated and derived, the optical imaging system for pickup satisfies related conditions as shown in Table 18 below, and the related symbols have been described above and thus will not be described again.

TABLE 18

Data of related relations of this preferred embodiment

| Relation | Data | Relation | Data |
|---|---|---|---|
| $v_1/v_2$ | 2.35 | $R_7/R_8$ | −0.12 |
| $CT_2/CT_3$ | 0.53 | $(R_3 + R_4)/(R_3 − R_4)$ | 1.47 |

TABLE 18-continued

Data of related relations of this preferred embodiment

| Relation | Data | Relation | Data |
|---|---|---|---|
| $CT_4/CT_5$ | 0.57 | $f/f_1$ | 1.56 |
| $R_4/f$ | 0.43 | $f/f_4$ | 0.28 |
| $f/R_8$ | −0.05 | | |

According to the optical data as shown in Table 16 and the series of aberration curves as shown in FIG. 6B, the optical lens for image pickup in accordance with this preferred embodiment of the present invention provides good correction results in aspects of the longitudinal spherical aberration, astigmatic field curving, and distortion.

In the optical lens for image pickup of the present invention, the lens elements can be made of glass or plastic. For the lens elements made of glass, the optical lens for image pickup can be installed more flexibly. For the lens elements made of plastic, the production cost can be lowered.

As used throughout the specification and claims, in the optical lens for image pickup of the present invention, if the lens element has a convex surface, then the surface of the lens element is convex at a position proximate to the optical axis; and if the lens element has a concave surface, then the surface of the lens element is concave at a position proximate to the optical axis.

In the optical lens for image pickup of the present invention, at least one aperture stop such as a glare stop or a field stop is provided for reducing stray lights to improve the image quality.

In the optical lens for image pickup of the present invention, the aperture stop can be a front or middle aperture stop. If the aperture stop is a front aperture stop, a longer distance between the exit pupil of the optical lens for image pickup and the image plane can be achieved to provide the telecentric effect and improve the efficiency of receiving images by the image sensor such as a CCD or CMOS image sensor. If the aperture stop is a middle aperture stop, the view angle of the system can be increased, such that the optical lens for image pickup has the advantage of a wide-angle lens.

Tables 1 to 18 show changes of values of an optical lens for image pickup in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. A plurality of optical lenses for image pickup, sequentially arranged from an object side to an image side, with no intervening lenses, comprising:

a first lens element with positive refractive power having a convex object-side surface;

a second lens element with negative refractive power;

a third lens element with refractive power;

a fourth lens element with positive refractive power having a convex object-side surface and a convex image-side surface, at least one of the object-side surface and the image-side surface being aspheric, and made of plastic; and a fifth lens element with negative refractive power having a concave image-side surface, and at least one of the object-side surface and the image-side surface being aspheric, having at least one inflection point, and made of plastic;

wherein, $R_7$ is a curvature radius of the object-side surface of the fourth lens element, $R_8$ is a curvature radius of the image-side surface of the fourth lens element, and the following relation is satisfied:

$-1.0 < R_7/R_8 < 0$.

2. The optical lens for image pickup of claim 1, wherein the second lens element has a concave image-side surface.

3. The optical lens for image pickup of claim 2, wherein f is a focal length of the optical lens for image pickup, $f_4$ is a focal length of the fourth lens element, and the following relation is satisfied:

$0 < f/f_4 < 1.0$.

4. The optical lens for image pickup of claim 3, wherein $R_3$ is a curvature radius of the object-side surface of the second lens element, $R_4$ is a curvature radius of the image-side surface of the second lens element, and the following relation is satisfied:

$0 < (R_3+R_4)/(R_3-R_4) < 1.8$.

5. The optical lens for image pickup of claim 2, wherein f is a focal length of the optical lens for image pickup, $f_1$ is a focal length of the first lens element, and the following relation is satisfied:

$1.2 < f/f_1 < 1.8$.

6. The optical lens for image pickup of claim 5, wherein $CT_4$ is a central thickness of the fourth lens element, $CT_5$ is a central thickness of the fifth lens element, and the following relation is satisfied:

$0.2 < CT_4/CT_5 < 1.4$.

7. The optical lens for image pickup of claim 2, wherein $v_1$ is an Abbe number of the first lens element, $v_2$ is an Abbe number of the second lens element, and the following relation is satisfied:

$1.7 < v_1/v_2 < 3.0$.

8. The optical lens for image pickup of claim 7, wherein $R_4$ is a curvature radius of the image-side surface of the second lens element, f is a focal length of the optical lens for image pickup, and the following relation is satisfied:

$0 < R_4/f < 1.5$.

9. The optical lens for image pickup of claim 7, wherein $CT_2$ is a central thickness of the second lens element, $CT_3$ is a central thickness of the third lens element, and the following relation is satisfied:

$0.2 < CT_2/CT_3 < 0.8$.

10. The optical lens for image pickup of claim 1, wherein $R_7$ is the curvature radius of the object-side surface of the fourth lens element, $R_8$ is the curvature radius of the image-side surface of the fourth lens element, and the following relation is satisfied:

$-0.5 < R_7/R_8 < 0$.

11. The optical lens for image pickup of claim 1, wherein at least one of the object-side surface and the image-side surface of the fourth lens element has at least one inflection point.

12. A plurality of optical lenses for image pickup, sequentially arranged from an object side to an image side, with no intervening lenses, comprising:

a first lens element with positive refractive power having a convex object-side surface;

a second lens element with negative refractive power having a concave image-side surface;

a third lens element with refractive power having a concave object-side surface;

a fourth lens element with positive refractive power having a convex object-side surface and a convex image-side surface, at least one of the object-side surface and the image-side surface being aspheric, and made of plastic; and a fifth lens element with negative refractive power having a concave image-side surface, and at least one of an object-side surface and the image-side surface being aspheric, at least one of the object-side surface and the image-side surface having at least one inflection point, and made of plastic;

wherein, f is a focal length of the optical lens for image pickup, $f_4$ is a focal length of the fourth lens element, $CT_4$ is a central thickness of the fourth lens element, $CT_5$ is a central thickness of the fifth lens element, $R_8$ is a curvature radius of the image-side surface of the fourth lens element, and the following relations are satisfied:

$0 < f/f_4 < 1.0$;

$0.2 < CT_4/CT_5 < 1.4$; and $-0.7 < f/R_8 < 0$.

13. The optical lens for image pickup of claim 12, wherein f is the focal length of the optical lens for image pickup, $f_1$ is a focal length of the first lens element, and the following relation is satisfied:

$1.2 < f/f_1 < 1.8$.

14. The optical lens for image pickup of claim 13, wherein $v_1$ is an Abbe number of the first lens element, $v_2$ is an Abbe number of the second lens element, and the following relation is satisfied:

$1.7 < v_1/v_2 < 3.0$.

15. The optical lens for image pickup of claim 13, wherein $R_7$ is a curvature radius of the object-side surface of the fourth lens element, $R_8$ is a curvature radius of the image-side surface of the fourth lens element, and the following relation is satisfied:

$-0.5 < R_7/R_8 < 0$.

16. The optical lens for image pickup of claim 14, wherein $R_3$ is a curvature radius of the object-side surface of the second lens element, $R_4$ is a curvature radius of the image-side surface of the second lens element, and the following relation is satisfied:

$0 < (R_3+R_4)/(R_3-R_4) < 1.8$.

17. The optical lens for image pickup of claim 13, wherein the third lens element has a convex image-side surface.

18. A plurality of optical lenses for image pickup, sequentially arranged from an object side to an image side, with no intervening lenses, comprising:

a first lens element with positive refractive power having a convex object-side surface;
a second lens element with negative refractive power having a concave image-side surface;
a third lens element with refractive power having a concave object-side surface and a convex image-side surface;
a fourth lens element with positive refractive power having a convex object-side surface and a convex image-side surface, at least one of the object-side surface and the image-side surface being aspheric, and made of plastic; and
a fifth lens element with negative refractive power, at least one of the object-side surface and the image-side surface being aspheric, at least one of the object-side surface and the image-side surface having at least one inflection point, and made of plastic;

wherein f is a focal length of the optical lens for image pickup, $f_4$ is a focal length of the fourth lens element, $R_4$ is a curvature radius of the image-side surface of the second lens element, $R_8$ is a curvature radius of the image-side surface of the fourth lens element, and the following relations are satisfied:

$0 < f/f_4 < 1.0$;

$0 < R_4/f < 1.5$; and $-0.7 < f/R_8 < 0$.

19. The optical lens for image pickup of claim 18, wherein $v_1$ is an Abbe number of the first lens element, $v_2$ is an Abbe number of the second lens element, and the following relation is satisfied:

$1.7 < v_1/v_2 < 3.0$.

20. The optical lens for image pickup of claim 18, wherein $CT_4$ is a central thickness of the fourth lens element, $CT_5$ is a central thickness of the fifth lens element, and the following relation is satisfied:

$0.2 < CT_4/CT_5 < 1.4$.

21. The optical lens for image pickup of claim 18, wherein f is the focal length of the optical lens for image pickup, $f_1$ is a focal length of the first lens element, and the following relation is satisfied:

$1.2 < f/f_1 < 1.8$.

22. The optical lens for image pickup of claim 18, wherein $CT_2$ is a central thickness of the second lens element, $CT_3$ is a central thickness of the third lens element, and the following relation is satisfied:

$0.2 < CT_2/CT_3 < 0.8$.

* * * * *

UNITED STATES PATENT AND TRADEMARK OFFICE
CERTIFICATE OF CORRECTION

PATENT NO. : 8,743,478 B2
APPLICATION NO. : 13/399426
DATED : June 3, 2014
INVENTOR(S) : Tsung-Han Tsai and Ming-Ta Chou It is certified that error appears in the above-identified patent and that said Letters Patent is hereby corrected as shown below:

IN THE SPECIFICATION:

Column 2, line 56, please correct equation 9 from "$-1.0 < R_7/R_8 < 0$" to "$-0.5 < R_7/R_8 < 0$"

Signed and Sealed this
Eighteenth Day of November, 2014

Michelle K. Lee
*Deputy Director of the United States Patent and Trademark Office*